(12) United States Patent
Peña Muñoz et al.

(10) Patent No.: US 10,901,959 B2
(45) Date of Patent: Jan. 26, 2021

(54) SYSTEM, METHOD, AND PROGRAM FOR RECONCILING INPUT DATASETS WITH A MODEL ONTOLOGY

(71) Applicant: FUJITSU LIMITED, Kawasaki (JP)

(72) Inventors: Manuel Peña Muñoz, Seville (ES); Victor De La Torre, Madrid (ES)

(73) Assignee: FUJITSU LIMITED, Kawasaki (JP)

( * ) Notice: Subject to any disclaimer, the term of this patent is extended or adjusted under 35 U.S.C. 154(b) by 410 days.

(21) Appl. No.: 15/933,972

(22) Filed: Mar. 23, 2018

(65) Prior Publication Data

US 2018/0336221 A1    Nov. 22, 2018

(30) Foreign Application Priority Data

May 22, 2017   (EP) ..................................... 17172293

(51) Int. Cl.

| | |
|---|---|
| G06F 16/00 | (2019.01) |
| G06F 16/185 | (2019.01) |
| G06F 7/535 | (2006.01) |
| G06N 5/02 | (2006.01) |
| G06F 16/36 | (2019.01) |

(52) U.S. Cl.
CPC ............ *G06F 16/185* (2019.01); *G06F 7/535* (2013.01); *G06F 16/367* (2019.01); *G06N 5/022* (2013.01)

(58) Field of Classification Search
CPC ...................................................... G06F 16/00
USPC ........................... 707/E17.046, E17.098, 772
See application file for complete search history.

(56) References Cited

U.S. PATENT DOCUMENTS

| | | |
|---|---|---|
| 2007/0067285 A1 | 3/2007 | Blume et al. |
| 2007/0233656 A1 | 10/2007 | Bunescu et al. |
| 2009/0144609 A1 | 6/2009 | Liang et al. |
| 2012/0166371 A1* | 6/2012 | Sweeney ................ G06N 7/005 706/14 |

(Continued)

FOREIGN PATENT DOCUMENTS

| | | |
|---|---|---|
| DE | 102016220771.7 | 10/2016 |
| DE | 102016220781.4 | 10/2016 |
| EP | 3 001 329 | 3/2016 |

OTHER PUBLICATIONS

Extended European Search Report dated Sep. 4, 2017 in corresponding European Patent Application No. 17172293.7, 9 pages.

(Continued)

*Primary Examiner* — Baoquoc N To
(74) *Attorney, Agent, or Firm* — Staas & Halsey LLP

(57) ABSTRACT

Embodiments include a system for reconciling input datasets with a model ontology, the system comprising a processor coupled to a memory, to execute: a model ontology storage process, storing a model ontology graph defining a concept hierarchy, the concept hierarchy comprising nodes at various levels. The processor and memory further to execute: a user interface process, receiving, via a user interface, user input assignments of nodes from upper levels of the concept hierarchy to input datasets with particular properties from among the lower level nodes. The processor and memory further to execute an input dataset reconciliation process using the concept hierarchy and a record of historical user input assignments to determine which higher level nodes to assign to a new input dataset, based on the lower level nodes represented in the new input dataset.

14 Claims, 8 Drawing Sheets

(56) References Cited

U.S. PATENT DOCUMENTS

| | | | |
|---|---|---|---|
| 2012/0166372 A1* | 6/2012 | Ilyas | G06F 16/84 706/14 |
| 2013/0046723 A1* | 2/2013 | Sweeney | G06F 16/3344 706/47 |
| 2013/0060785 A1* | 3/2013 | Sweeney | G06F 16/3344 707/748 |
| 2013/0066823 A1* | 3/2013 | Sweeney | G06N 5/02 706/50 |
| 2014/0229161 A1 | 8/2014 | Gliozzo | |
| 2018/0113888 A1 | 4/2018 | Peña Muñoz et al. | |
| 2018/0113926 A1 | 4/2018 | Llaves et al. | |

OTHER PUBLICATIONS

Abdelghani Bakhtouchi et al., "Ontologies and Functional Dependencies for Data Integration and Reconciliation", Oct. 31, 2011, Network and Parallel Computing, pp. 98-107**.

Shusaku Tsumoto et al., "Construction of Linguistic Variables based on Rule Induction and Concept Hierarchy", 2016 IEEE 15$^{th}$ International Conference on Cognitive Informatics & Cognitive Computing (ICCI*CC), Aug. 22, 2016, pp. 516-522**.

Ichise Ryutaro et al., "Rule Induction for Concept Hierarchy Alignment", Aug. 10, 2001, Retrieved from http://www-kasm.nii.ac.jp/papers/takeda/01/ichise_IJICAI-OL.pdf, retrieved on Aug. 25, 2017, 4 pages**.

David Nadeau et al., "A survey of named entity recognition and classification", 1991, pp. 1-20.

Jun'ichi Kazama et al., "Tuning Support Vector Machines for Biomedical Named Entity Recognition", 2002, 8 pages.

Alan Ritter et al., "Named Entity Recognition in Tweets: An Experimental Study", 2011, 11 pages.

Joel Nothman et al., "Learning multilingual named entity recognition from Wikipedia", Mar. 7, 2013, pp. 1-55.

European Summons to Attend Oral Proceedings dated Jul. 27, 2020 in European Patent Application No. 17172293.7.

Mariel A. Ale, et al., "A conceptual model and technological support for organizational knowledge management", Science of Computer Programming 95, 2014, 20 pages.

Mariano Rodriguez-Muro et al., "Realizing Ontology Based Data Access: A Plug-in for PROTEGE", ICDE Workshop 2008, 4 pages.

Sebastian Bremm et al., "Assisted Descriptor Selection Based on Visual Comparative Data Analysis", IEEE Symposium on Visualization 2011, vol. 30, No. 3, 10 pages.

Sajendra Kumar, et al., "Ontology based Semantic Indexing Approach for Information Retrieval System", International Journal of Computer Applications, vol. 49, No. I2, Jul. 2012, 5 pages.

* cited by examiner

SYSTEM, METHOD, AND PROGRAM FOR RECONCILING INPUT DATASETS WITH A MODEL ONTOLOGY

CROSS-REFERENCE TO RELATED APPLICATIONS

This application claims the benefit of European Patent Application No. 17172293.7, filed May 22, 2017, in the European Intellectual Property Office, the disclosure of which is incorporated herein by reference.

BACKGROUND

1. Field

The embodiments lie in the field of data storage and in particular relates to the recognition of input datasets.

2. Description of the Related Art

A challenge in the data science domain is the integration of input datasets from heterogeneous data sources with different structures, formats, and nature. In most cases, knowing how to interpret an input dataset, or which information the data is related to, is a key element for a correct data interpretation and hence integration. In many cases, to integrate the input dataset properly it is necessary to have a background in the field of knowledge represented by the input dataset.

Information represented in input datasets takes an increasingly important role in the decision making of technological enterprises. Enabling machines to accurately describe datasets at varying levels of abstraction is desirable if the knowledge contained in input datasets is to be harvested.

The interoperability of machines is enhanced by storing datasets with accurate descriptors. Furthermore, the accessibility and efficiency of storage is enhanced with meaningfully annotated data.

Processing overheads are imposed in data centers by cross-device traversals and access operations.

It is desirable to enhance the ability of machines to recognize context and knowledge domains for input datasets.

SUMMARY

Additional aspects and/or advantages will be set forth in part in the description which follows and, in part, will be apparent from the description, or may be learned by practice of the embodiments.

Embodiments include a system for reconciling input datasets with a model ontology, the system comprising a processor coupled to a memory, to execute: a model ontology storage process, storing a model ontology graph defining a concept hierarchy, the concept hierarchy comprising: second level nodes at a second level of the concept hierarchy, each second level node representing a respective entity type; and first level nodes at a first level of the concept hierarchy, each first level node representing a respective property, and being linked in the graph to one or more second level nodes. The processor and memory further to execute: a user interface process, receiving, via a user interface, for each of a plurality of input datasets each having values of one or more properties represented by first level nodes of the concept hierarchy, a second level user input assignment that assigns an entity type represented by a second level node to an entity represented by said values in the dataset; a user input assignment storage process, calculating and storing, for a plurality of node pairs comprising one of the second level nodes and one of the first level nodes, a first relation quotient representing a number of the received second level user input assignments that assign the entity type represented by the second level node to an entity represented by a value of the property represented by the first level node; and an input dataset reconciliation process: receiving an input dataset having values of a plurality of properties represented by first level nodes of the concept hierarchy; selecting a second level node from the concept hierarchy based on: links in the concept hierarchy between the second level node and first level nodes representing properties in the received input dataset; and the first relation quotients between the second level node and first level nodes representing properties in the received input dataset; and storing the input dataset in a reconciled dataset storage as graph data with the values of the plurality of properties linked to respective first level nodes and the first level nodes linked to the selected second level node.

The system may comprise a computing device or plurality of interconnected computing devices, comprising a memory storing processing instructions and a processor coupled to the memory and configured to execute processing elements of the processing instructions.

Embodiments automate the recognition of entity type and domain descriptors to assign to input datasets, thus reconciling/aligning the input datasets with a model ontology. The system operates as a machine able to contextualize and interpret datasets.

The system reduces considerably the manual involvement in ETL (extract, transform, load) tasks which are low value-added tasks. The system enhances and facilitates the machine-readable aspect of data, especially in un-standardized data, extracting added value from the data by reconciling input datasets with a model ontology. The system is operable to apply reasoning to the task of reconciliation by utilizing data representing user preferences stored in the knowledge base, based on ontologies and user preferences. The system does not rely on hard-wired knowledge but is configured to customize dynamically the decision making involved in reconciliation based on knowledge from other data sources and user preferences. The system facilitates the automation of data interpretation and ingestion for assistants and intelligent platforms.

The system learns from historical user input assignments of higher level descriptors to input datasets characterized by the set of properties for which values are contained in the dataset, to inform the future assignment of entity-type and domain (i.e. higher) level descriptors to input datasets. Entity type recognition is based on both knowledge acquired from ontologies and user preferences. Domain recognition is based on both knowledge acquired from ontologies and user preferences.

The entity type selected for the input dataset can be used as a key or index for identifying a physical data storage device on which to store the input dataset in the reconciled data store. The reconciled data store makes multiple input datasets accessible via a single access point and stores data in a manner which reduces cross-device traversal and access operations.

How to acquire data in an autonomous manner and know how to interpret the information automatically takes a relevant role in the new generation of intelligent systems and assistants. Embodiments provide a system for entity type and optionally also domain recognition based on knowledge and user preferences, which provides the following benefits:

Reduce considerably the effort in ETL tasks which are low value-added tasks.

Enhance and facilitate the machine-readable aspect of data, especially in un-standardized data, extracting added value from the data.

Enhance the reasoning supported by annotations in the knowledge base based on ontologies and user preferences.

Customize dynamically the decision making based on knowledge and user preferences.

Facilitate the automation of data interpretation and ingestion for assistants and intelligent platforms.

Once entity type and domain for a named entity can be determined, the understanding of unstructured data by a machine is aided, because the machine is able to determine context and meaning of the appearance of the named entity within speech or text.

Embodiments also include a computer-implemented method for reconciling input datasets with a model ontology, the computer-implemented method comprising: a model ontology storage process, storing a model ontology graph defining a concept hierarchy, the concept hierarchy comprising: second level nodes at a second level of the concept hierarchy, each second level node representing a respective entity type; and first level nodes at a first level of the concept hierarchy, each first level node representing a respective property, and being linked in the graph to one or more second level nodes. The method further comprises: a user interface process, receiving, via a user interface, for each of a plurality of input datasets each having values of one or more properties represented by first level nodes of the concept hierarchy, a second level user input assignment, assigning an entity type represented by a second level node to an entity represented by said values in the dataset; a user input assignment storage process, calculating and storing, for a plurality of node pairs comprising one of the second level nodes and one of the first level nodes, a first relation quotient representing a number of the received user input assignments assigning the entity type represented by the second level node to an entity represented by a value of the property represented by the first level node. The method further comprises: an input dataset reconciliation process: receiving an input dataset having values of a plurality of properties represented by first level nodes of the concept hierarchy; selecting a second level node from the concept hierarchy based on: links in the concept hierarchy between the second level node and first level nodes representing properties in the received input dataset; and the first relation quotients between the second level node and first level nodes representing properties in the received input dataset; and storing the input dataset in a reconciled dataset storage as graph data with the values of the plurality of properties linked to respective first level nodes and the first level nodes linked to the selected second level node.

Embodiments also include a computer program which, when executed by a computing apparatus, causes the computing apparatus to perform the above-recited method.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
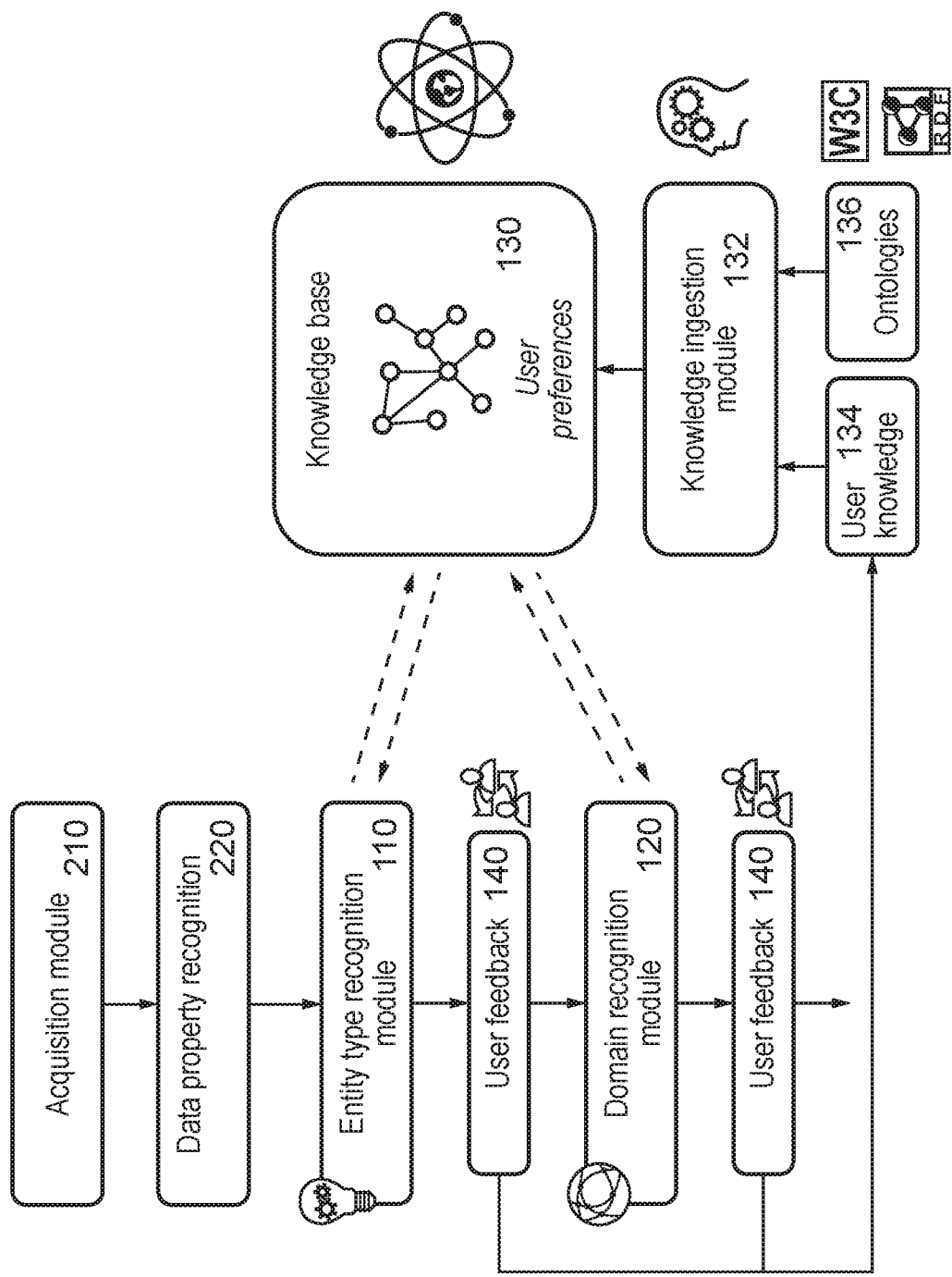
FIG. 1 illustrates an overview of a functional architecture of a system for reconciling input datasets with a concept hierarchy defined by a model ontology.

Reference will now be made in detail to the embodiments, examples of which are illustrated in the accompanying drawings, wherein like reference numerals refer to the like elements throughout. The embodiments are described below by referring to the figures.

A note regarding terminology: In the below description and claims, a plurality of quotients will be defined and discussed. A quotient is attributed a label from "ontology" and "relation". A "relation quotient" represents user input assignments, and may comprise a "user component" representing user input assignments of a specific user, and a "collective component" representing user input assignments of a population of users collectively. An "ontology quotient" represents relationships in the model ontology graph. A quotient is also attributed a label from "first", "second", and "third", these labels denoting positions of the nodes in the hierarchy. A "first . . . quotient" is between a second level node and a first level node. A "second . . . quotient" is between a third level node and a second level node. A "third . . . quotient" is between a third level node and a first level node. Likewise, a "first . . . component" is between a second level node and a first level node. A "second . . . component" is between a third level node and a second level node. A "third . . . component" is between a third level node and a first level node.

Systems may be provided with or without the acquisition module 210 and the data property recognition module 220.

In systems provided without the acquisition module 210 and the data property recognition module 220, it is assumed that input datasets, that is, datasets for reconciliation with the concept hierarchy, are composed of values of recognized properties, and the mapping of values to recognized properties is known. Wherein, recognized properties are properties represented by nodes in the concept hierarchy. Thus, values in the input datasets are attributable to a property represented by a property-level, or first level, node in the concept hierarchy.

In systems provided with the acquisition module 210 and the data property recognition module 220, input datasets, that is, datasets read into the system by the acquisition module 210 from their native storage, are assigned a property represented by a property-level, or first level, node in the concept hierarchy to the or each of one or more sets of values. The assigning of a property may be a consequence of a match being identified between the property represented by the set of values in the input dataset and an existing property-level node in the concept hierarchy. Alternatively, if no match can be found, a new property-level node corresponding to the set of values in the input dataset is added to the concept hierarchy and assigned to the set of values. Wherein a set of values is, for example, a column of values in a tabular data set or a collection of values instantiating the same property-level concept in a data graph.

The acquisition module 210 collects, extracts and integrates heterogeneous and distributed data into the system in the form of input datasets. The input datasets may be in different formats and contain different grades of information complexity.

The data property recognition module 220 normalizes the data with the purpose of providing the standardized data properties to the entity type recognition module 110. The data property recognition module 220 supports the process in order to provide datasets having values which are mapped to one of the property-level nodes in the concept hierarchy. The data property recognition module 220 assigns a property-level node from the concept hierarchy to a property represented by a set of values within an input dataset, given the descriptor/property of the data input. The data property recognition module 220 receives raw data with their descriptors (i.e. native property labels) and, based on semantics of the descriptor and values of the property and knowledge, reconciles the descriptors with property-level nodes in the concept hierarchy, a process which is described in more detail in German patent applications DE102016220781.4 & DE102016220771.7, the contents of which are incorporated herein by reference. If an existing property-level node cannot be found for a property represented by a set of values in the dataset, then a new property level node is added to the concept hierarchy, using a property label from the input dataset.

Figures 2, 3:
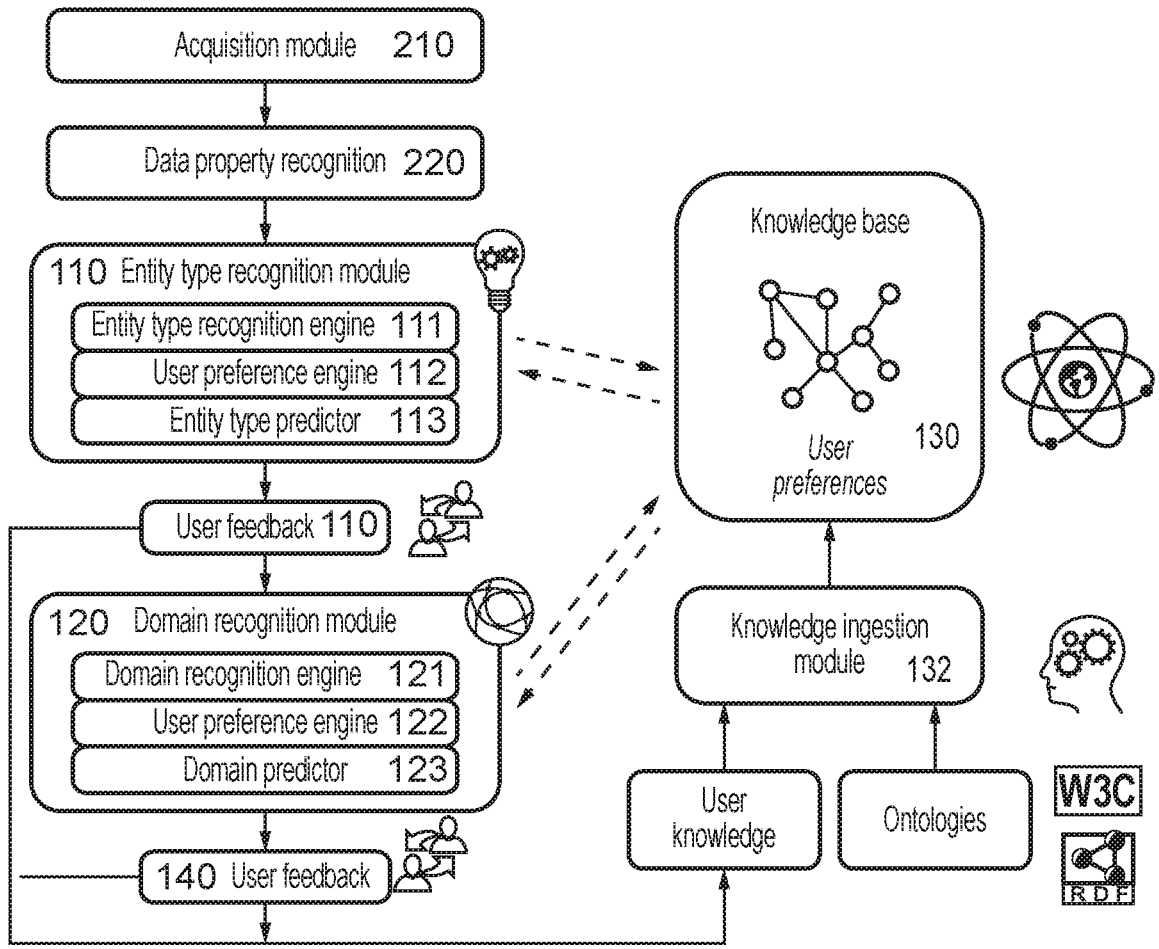
FIG. 2 illustrates a system for reconciling input datasets with a concept hierarchy defined by a model ontology.
FIG. 3 illustrates a principle of operation of a property reconciliation module.

The principle of operation of the property recognition module 220 is illustrated in FIG. 3. In FIG. 3 it can be seen that raw data comprising a value of each of three properties for each of three entities is acquired as raw data. The properties are labeled with a descriptor. The data property recognition module 220 comprises a semantics engine 221 which compares the semantics of descriptors labeling the properties in the raw data with the semantics of property level nodes in the concept hierarchy. The data property recognition module 220 comprises a data value fingerprint engine 222 which compares statistical characteristics of the values of the properties in the raw data with the statistical characteristics of sets of values representing the property level nodes in the concept hierarchy defined by the concept hierarchy. Based on the comparisons each set of values (i.e. each column) is assigned a property represented by a first level, or property level, node in the concept hierarchy.

Whether the acquisition module 210 and the data property recognition module 220 are included in the system or are external modules providing data to the system, said modules may be provided by a data property recognition apparatus, data property recognition method, or data property recognition program such as that disclosed in German patent applications DE102016220781.4 & DE102016220771.7, the contents of which are incorporated herein by reference.

The entity type recognition module 110 is configured to use historical user input assignments of entity types to properties, and a concept hierarchy linking properties to entity types, to select an entity type from among those represented in the concept hierarchy to assign to an input dataset. The entity type recognition module 110 performs a first stage of a reconciliation process, the second, optional, stage being performed by the domain recognition module 120. The input dataset is characterized by the identity of the properties represented by values in the dataset, from among the properties represented by first level nodes in the concept hierarchy. The characterization is used in the entity type recognition module 110 to select an entity type represented by a second level node in the concept hierarchy to assign to the input dataset in the reconciled dataset storage.

The domain recognition module 120 is configured to use historical user input assignments of domains to datasets, and a concept hierarchy linking domains to entity types and properties, to select a domain from among those represented in the concept hierarchy to assign to an input dataset. The domain recognition module 120 performs an optional second stage of a reconciliation process, the first stage being performed by the entity type recognition module 110. The input dataset is characterized by the identity of the properties represented by values in the dataset, from among the properties represented by first level nodes in the concept hierarchy, and by the entity type assigned to the dataset by the entity type recognition module 110. The characterization is used in the domain recognition module 120 to select a domain represented by a third level node in the concept hierarchy to assign to the input dataset in the reconciled dataset storage.

User feedback can be provided via a user interface 140 following the operation of the entity type recognition module 110 or the domain recognition module 120. The user feedback may be, for example, a user assignment of one entity type from plural entity types selected by the entity type recognition module 110, or a user assignment of one domain from plural domains selected by the domain recognition module 120.

For example, the entity type recognition module 110 determines the top ranked entity types for the data properties represented in the input dataset. This determination is based on knowledge, the user preferences, and the preferences of other users. The top scored entity types are offered to the user via the user interface to provide the user the control to select an entity type to assign to the input dataset from among the top ranked entity types determined by the system.

For example, the domain recognition module 120 determines the top ranked domain of the entities for the data properties represented in the input dataset and the selected entity type. This determination is based on standardized data properties, the entity types determined by the entity type recommendation module and selected by the user, the user preferences and the concept hierarchy. The top scored domains are offered to the user via the user interface to provide the use to assign to the input dataset from among the top ranked domains determined by the system.

The knowledge base 130 performs a model ontology storage process, storing a model ontology graph defining a concept hierarchy, the concept hierarchy comprising second level nodes at a second level of the concept hierarchy, each second level node representing a respective entity type, first level nodes at a first level of the concept hierarchy, each first level node representing a respective property, and being linked in the graph to one or more second level nodes, and also third level nodes at a third level of the concept hierarchy, each third level node representing a respective domain and being linked in the graph to one or more second level nodes and to one or more third level nodes. In a particular example, the different levels of the hierarchy are: Domain, Entity Type and Property. One domain has one or more entity types (are linked). And one entity type has one or more properties (also linked). For instance, the hardware domain (Domain) has one component (Entity type) and this component has several descriptors which define the component, i.e. name, model number, id number, etc (Properties) that are linked to the entity type, and also, linked to the hardware domain (Domain). The model ontology may be constrained so that for a given property there is a corresponding entity type to which the property relates (i.e. represents an attribute/limitation of instances of the entity type), the constraint in the model ontology being that the property node is connected to the corresponding entity type node. And also, for each entity type there is a corresponding domain to which the entity type belongs, the constraint in the model ontology being a connection between the entity type node and the corresponding domain node. Furthermore, each property belongs to a corresponding domain, and the model ontology is constrained so that each property node is connected to the corresponding domain node.

The knowledge base 130 in association with the knowledge ingestion module performs a user input assignment storing process, storing a record of historical user assignments of entity types, represented by second level nodes, and domains, represented by third level nodes, to input datasets characterized by the properties, represented by first level nodes, of which values are stored in the respective input dataset. The user input assignment storing process also includes calculating quotients representing said historical user assignments, and storing said quotients. For example, the first, second, and third relation quotients.

For example, the knowledge base module 130 stores knowledge extracted from ontologies as a model ontology and stores a representation of historical user input assignments as relation quotients for use by the system in ranking entity types and domains for an input dataset. The model ontology defines the concept hierarchy.

The knowledge ingestion module 132 performs processes in cooperation with the knowledge base including a user input assignment storage process. The knowledge base 130 can be considered to be the stored data and the hardware storing said data, and the knowledge ingestion module 132 a processing mechanism that determines what data to store, including calculating quotients representing user input assignments. The knowledge base 130 may also have processing capacity, for calculating confidence values, weightings, and updating quotients. Optionally, the knowledge base has algorithms to balance weights, confidence and preference weightings, and also, nodes (property, entity type and domain) relevance. The user input assignment storage process may include calculating and storing, for a plurality of node pairs comprising one of the second level nodes and one of the first level nodes, a first relation quotient representing a number of the received user input assignments assigning the entity type represented by the second level node to an entity represented by a value of the property represented by the first level node. It is noted that corresponding information for the third level nodes may also be calculated and stored for: a plurality of node pairs comprising one of the third level nodes and one of the first level nodes, a third relation quotient representing a number of the received user input assignments assigning the domain represented by the third level node to an entity represented by a value of the property represented by the first level node; and a plurality of node pairs comprising one of the third level nodes and one of the second level nodes, a second relation quotient representing a number of the received user input assignments assigning the domain represented by the third level node to an entity assigned the entity type represented by the second level node. The knowledge ingestion module 132 provides a mechanism to parse and acquire information provided by ontologies 136 like OWL for addition to the model ontology, and to parse and acquire information provided by user input assignments 134 regarding entity types or domain selections.

FIG. 2 is a particular example of the system illustrated in FIG. 1. In the example of FIG. 2, the entity type recognition module 110 comprises an entity type recognition engine 111, an entity type user preference engine 112, and an entity type predictor 113. The domain recognition module 120 comprises a domain recognition engine 121, a domain user preference engine 122, and a domain predictor 123.

Figure 4:
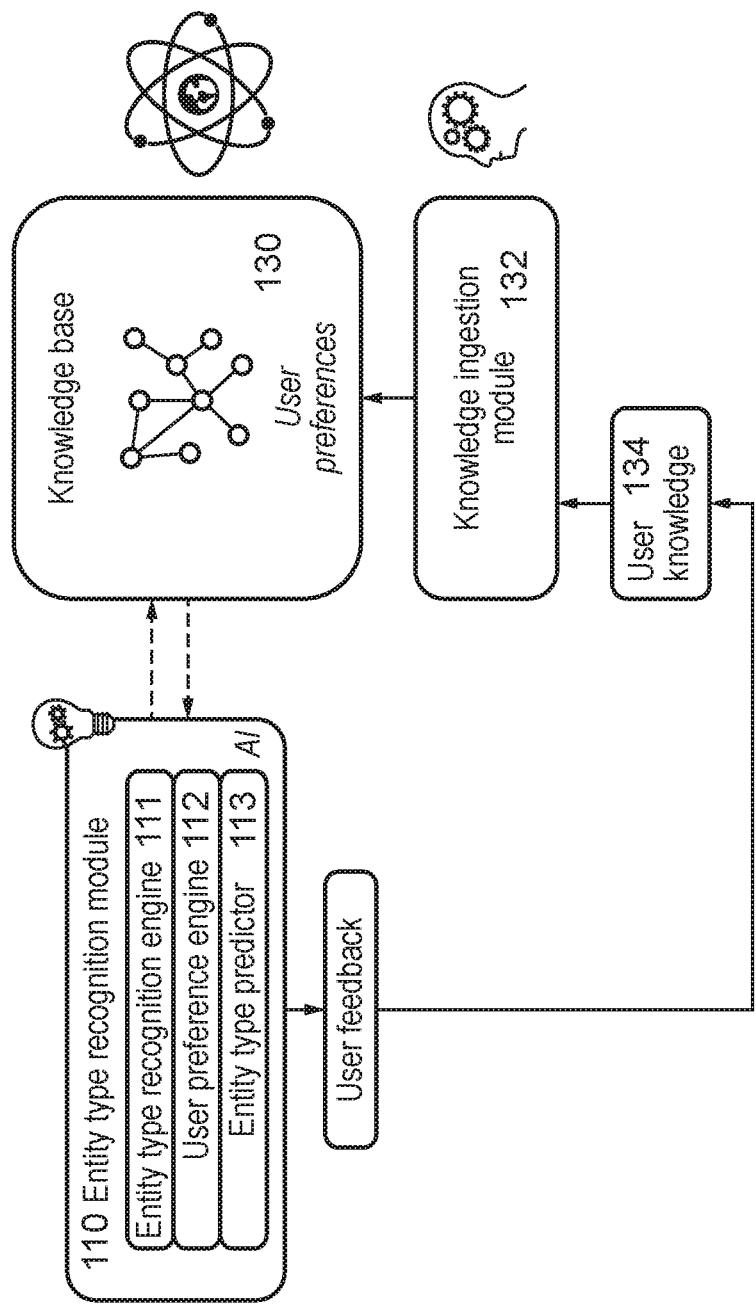
FIG. 4 illustrates an entity type recognition module.

The entity type recognition module 110 of FIG. 2 and its interaction with the knowledge base 130 and associated components is illustrated in more detail in FIG. 4.

The entity type recognition module 110 transforms a characterization of an input dataset as a set of standardized data property labels (standardized meaning conforming to the concept hierarchy) into an entity type selection, an entity type being a grouping or categorization applied to entities represented in the input dataset.

The interaction of the components illustrated in FIG. 4 in transforming the characterization of an input dataset as a set of standardized data property labels into a selection of one or more entity types with which to categories the entities represented in the input dataset in the reconciled data storage, will now be set out.

Figure 5:
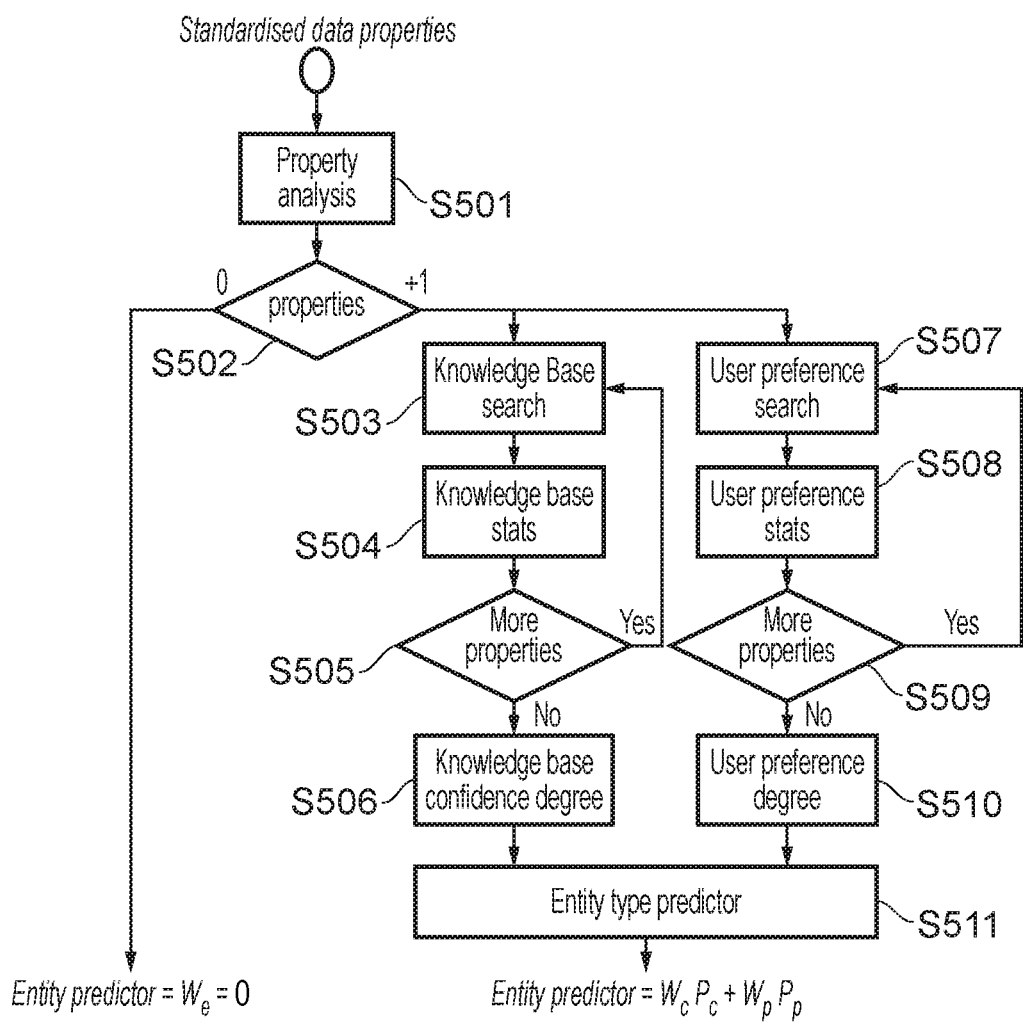
FIG. 5 illustrates an entity type recognition process.

FIG. 5 illustrates a flowchart representing the processing steps performed by the entity type recognition module into an entity type selection.

In this example, a function of the entity type recognition module 110 is to provide a scored list of entity types, from among those represented in the concept hierarchy by second level nodes, which scores represent accuracy of categorization of entities represented in the input dataset as the scored entity type, based on the characterization of the input dataset as a set of standardized properties. The entity type recognition module 110 component interacts with the knowledge base to extract insights from the concept hierarchy and historical user input assignments, process the information obtained from the knowledge base interaction to score the entity types, and finally, to utilize a user interface to present the highest scoring entity types (i.e. the names or labels of those entity types as defined in the concept hierarchy) to the user for selection of an entity type to assign to the input dataset in the reconciled data storage.

At step S501, the entity type recognition module 110 receives a characterization of an input dataset as a set of standardized data properties, that is, an identification of a plurality of labels or titles representing properties for which values are provided in the input dataset. The standardization is an indication that the labels or titles are aligned with (i.e. included among) the property level nodes in the concept hierarchy. At step S502 a property analysis is carried out by the entity type recognition module 110 to assess the number of properties. The property analysis may also include analyzing the data properties to check format and structure.

An exemplary procedure carried out by the entity type recognition engine 111 is set out below.

At step S503, the entity type recognition engine 111 identifies a first candidate set of entity types from the second level nodes representing entity types in the concept hierarchy. The identification is based on links (i.e. edges) between the second level nodes and first level nodes representing properties in the set of properties characterizing the input dataset.

The entity type recognition engine 111 receives a set of standardized properties as a characterization of an input dataset, and provides a set of entity types as a first candidate set. The entity type recognition engine 111 scores the members of the first candidate set based on the strength of relation in the concept hierarchy between the second level node representing the respective entity type and the first level nodes representing the set of standardized properties. The process is as follows:

For each standardized property the engine 111 queries the ontology model about all the entity types linked to this property in the concept hierarchy, obtaining a list of entity types. For example, the process of S503 includes querying the received data properties in the knowledge base and retrieving the results obtained, that is, the links to entity types. The results are composed of the standardized data properties searched, the entity types or concepts related with the data properties, and the type of relationships stored in the concept hierarchy.

The identified entity types within the first candidate set are individually scored based on said links. At S504, the results retrieved from the knowledge base for each property are converted into a metric, the first ontology quotient. Each property related with an entity type has a probability $P_i$ and a weight $W_i$. The probability is exemplary of the first ontology quotient, and may be calculated as:

$$P_i = \frac{1}{\sum_{j=1}^{n} r_j},$$

with $\sum_{j=1}^{n} r_j$ as the sum of all the relationships between the property prop and the different entity types $e_j$. For example, a relation is quantified as 1 for each relationship. That means, sum 1 for each relationship (i.e. edge in the model ontology) between the property (prop) and an entity type ($e_j$).

For instance, if one property has 3 connections, but only 2 are linked to the entity type ($e_j$), then the probability ($P_i$) between the property (prop) and the entity type ($e_j$) is 0.5 (½), is 2 instead of 3 because there is only 2 different entity types connected.

The weight $W_i$ is exemplary of the first ontology weight, and may be calculated in the knowledge base 130 and is an attribute of the edge between the property level node and the entity type level node in the concept hierarchy, for example, based on element relevance, centrality, and other parameters. This weight may be dynamic and modified according to newly acquired knowledge and the user preferences.

At S505 a check is performed to ensure that all received data properties are queried.

Finally, at S506, the engine 111 provides each member of the candidate set of entity types with a degree of confidence, a sum across the set of properties of the first ontology quotients, or a weighted sum thereof. For example, the degree of confidence representing a strength of relation between the entity type and the set of standardized properties in the concept hierarchy, calculated with the following formula:

$$\text{Confidence degree } P_c = W_e \left( \sum_{i=1}^{n} W_i P_i \right)$$

$W_e$—Weight of the degree of confidence for the specific entity type e. Refers to a relevance weight of the specific node, for entity type nodes in the model ontology.

$W_i$—First ontology weight: Weight of the degree of confidence for the relationship between property i and entity type e.

$P_i$—First ontology quotient: Prediction of confidence degree for the relationship between property i and entity type e.

$P_c$—Confidence Degree for the entity type (summed over properties).

As an example of how $W_e$ and $W_i$ are calculated, the knowledge base 130 may employ an artificial intelligence algorithm to calibrate the values of $W_e$ and $W_i$ which configures the weights for each component based on entity type rank for $W_e$ and the relevance of the relationships for $W_i$.

The entity type user preference engine 112 scores the members of the first candidate set based on historical user input assignments representing an assignment of an entity type to an input dataset characterized by a set of standardized data properties. The engine 112 queries the preferences of the user (i.e. the historical user input assignments of the user) for a given set of properties in the knowledge base 130, providing a set of scored entity types based on the historical user input assignments represented in the knowledge base, for example, as a relation quotient. The engine 112 may generate a score based on the specific user that is controlling a live reconciliation process, based on all users collectively, or based on both the specific user and all users collectively.

As a prerequisite for the functionality of the entity type user preference engine 112, the knowledge base 130 is loaded with data representing historical user input assignments of entity types represented by entity type (second) level nodes in the concept hierarchy to input datasets. In particular, the knowledge ingestion module 132 captures the historical user input assignments 134 and generates and stores first relation quotients representing an assignment frequency of entity type to input dataset, and in particular to the standardized data properties characterizing the input dataset. In other words, the knowledge base 130 and knowledge ingestion module 132 execute a user input assignment storage process, calculating and storing, for a plurality of node pairs comprising one of the second level nodes and one of the first level nodes, a first relation quotient representing a number of the received user input assignments assigning the entity type represented by the second level node to an entity represented by a value of the property represented by the first level node.

An exemplary process performed by the entity type user preference engine 112 is as follows:

At S507, for each standardized property prop, for which values are included in the input dataset (i.e. for each property represented by a first level node in the concept hierarchy and included in the set of standardized properties characterizing the input dataset) the entity type user preference engine 112 queries about all the entity types related with this property regarding to the historical user input assignments, represented within the knowledge base, of the particular user logged into the system and controlling the input of the dataset.

Each property prop related with an entity type $e_j$ has a probability $P'_i$, exemplary of the first user component, and a weight $W'_i$, exemplary of the first user weight. At S508, the probability $P'_i$ is calculated as:

$$P'_i = \frac{1}{\sum_{j=1}^{n} r'_j},$$

with $\sum_{j=1}^{n} r'_j$ as the sum of all the relationships between the property prop and different entity types $e_j$. For example, a relation is quantified as 1 for each relationship. That means, sum 1 for each relationship (for example, each recorded historical user assignment) between the property (prop) and an entity type ($e_j$). For instance, if one property has 3 connections, but only 2 are linked to the entity type ($e_j$), then the probability ($P'_i$) between the property (prop) and the entity type ($e_j$) is 0.5 (½), $r'_j$ is 2 instead of 3 because there is only 2 different entity types connected.

The relationships are quantified by first relation quotients, and specifically by first user components of first relation quotients, representing a number (or frequency or proportion) of the received user input assignments, by the particular user logged into the system and controlling the input of the dataset, assigning the entity type represented by the second level node representing the entity type $e_j$ to an entity represented by a value of the property represented by the first level node corresponding to prop. The weight $W'_i$ is calculated in the knowledge base 130 based on historical user input assignments, and is an attribute of the property-entity type-user triplet. For example, the weight $W'_i$ may increase the value depending on relevance. For instance, a history of the user choosing one property instead of another with the same $P'_i$. $P'_i$ may be referred to as a first user component of the first relation quotient. Alternatively, the product of $P'_i$ and $W'_i$ may be referred to as the first user component of the first relation quotient.

It is noted that, throughout this document, where a number of received user input assignments is referred to, the number may in fact be combined with other quantities, such as total number of user input assignments from the user, to be expressed as a proportion. So that, number is used to refer generically to quantities and statistics incorporating the number, and encompasses more limited expressions such as proportion or frequency.

In parallel, the engine queries the historical user input assignments in input datasets having values of the same set of standardized properties prop. Also included in S507, the entity type user preference engine 112 queries about all the entity types related with this property regarding to the historical user input assignments, represented within the knowledge base, of all users collectively.

Each property prop related with an entity type $e'_j$ has a probability $P''_i$ exemplary of the first collective component, and a weight $W''_i$, exemplary of the first collective weight. At S508, the probability $P''_i$ is calculated as:

$$P''_i = \frac{1}{\sum_{j=1}^{n} r''_j},$$

with $\sum_{j=1}^{n} r''_j$ as the sum of all the relationships between the property prop and different entity types $e'_j$. For example, a relation is quantified as 1 for each relationship. That means, sum 1 for each relationship (for example, each recorded historical user assignment) between the property (prop) and an entity type ($e'_j$). For instance, if one property has 3 connections, but only 2 are linked to the entity type ($e'_j$), then the probability ($P''_i$) between the property (prop) and the entity type ($e'_j$) is 0.5 (½), $r''_j$ is 2 instead of 3 because there is only 2 different entity types connected.

The relationships are quantified by first relation quotients, and specifically by first collective components of first relation quotients, representing a number of the received user input assignments assigning the entity type represented by the second level node to an entity represented by a value of the property represented by the first level node, from the user input assignments stored in association with the plurality of user IDs collectively. The weight is calculated in the knowledge base 130 based on historical user-input assignments, and is an attribute of the property-entity type pair. The weight may be calculated based on the element relevance, centrality, and other parameters. This weight may be dynamic and may change depending on new acquired knowledge and the user preferences.

At S509 a check is performed to ensure that all received data properties are queried.

The entity type user preference engine 112 calculates a first user component and a first collective component of a first relation quotient. The first relation quotient represents a number of the received user input assignments assigning the entity type represented by the second level node to an entity represented by a value of the property represented by the first level node.

At S510, the entity type user preference engine 112 combines each of the first user components and the first collective components on a per entity type basis, in order to generate a score for each entity type in the first candidate set. An exemplary formula for said combination is set out below:

$$\text{Preference degree } P_p = W_p \left( \sum_{i=1}^{n} W'_i P'_i + \sum_{i=1}^{n} W''_i P''_i \right)$$

$W_p$—Weight of the degree of preference for the specific entity type e. This is an attribute of the entity type (i.e. stored in association with the entity type level node representing the entity type in the concept hierarchy), and may be based on the relevance of the property into the knowledge base but regarding preference of the users. This value may be calculated into the knowledge base with AI algorithms based on relevance and centrality metrics.

$W'_i$—First user weight: Weight of the degree of preference for the relationship between property prep and entity type $e_i$ according with the concrete user.

$P'_i$—First user component: Prediction of the degree of preference for the relationship between property prop and entity type $e_i$ according with the concrete user.

$W''_i$—First collective weight: Weight of the degree of preference for the relationship between property prop and entity type e according with the all the users preferences.

$P''_i$—First collective component: Prediction of the degree of preference for the relationship between property prop and entity type $e'_i$ according with the all the users preferences.

The symbol "P" denotes a probability, but it can also be considered to represent a prediction. The prediction is based on metrics and using models of machine learning and artificial intelligence to calculate and predict the probability of the input dataset representing entities of a particular entity type.

As an example of how $W_p$, $W'_i$ and $W''_i$ are calculated, the knowledge base 130 may employ an artificial intelligence algorithm to calibrate the weights, based on entity type rank for $W_p$, and based on the historical user assignments for the pertinent user for W and the collective historical user assignments for W", respectively.

At S511, the entity type predictor 113 combines the score for each entity type in the first candidate set calculated by the entity type recognition module 11 and the score for each entity type in the first candidate set calculated by the entity type user preference engine 112, in order to generate a first candidate score for each entity type. An exemplary formula used by the entity type predictor in calculating the first candidate score for each entity type in the first candidate set is set out below:

$$\text{Entity type predictor} = W_e P_e + W_p P_p$$

As an example of how $W_e$ and $W_p$ are calculated, the knowledge base 130 may employ an artificial intelligence algorithm to calculate the weights, based on the degree of centricity for each element in the knowledge base and other parameters, obtaining a customized response for each user. In the entity type predictor equation, the weights $W_e$ and $W_p$ are not the entity type specific weights, but are general weightings applied to confidence degree (i.e. ontology quotient based on ontology structure/properties/information) and preference degree (i.e. relation quotient based on user input assignments).

Either: the highest scoring entity type is selected by the system and assigned to the input dataset, or, the n highest scoring entity types (wherein n is a positive integer greater than 1) are presented to the user via the user interface and a user input assignment selecting one entity type from among those presented is received (also via the user interface).

Figure 6:
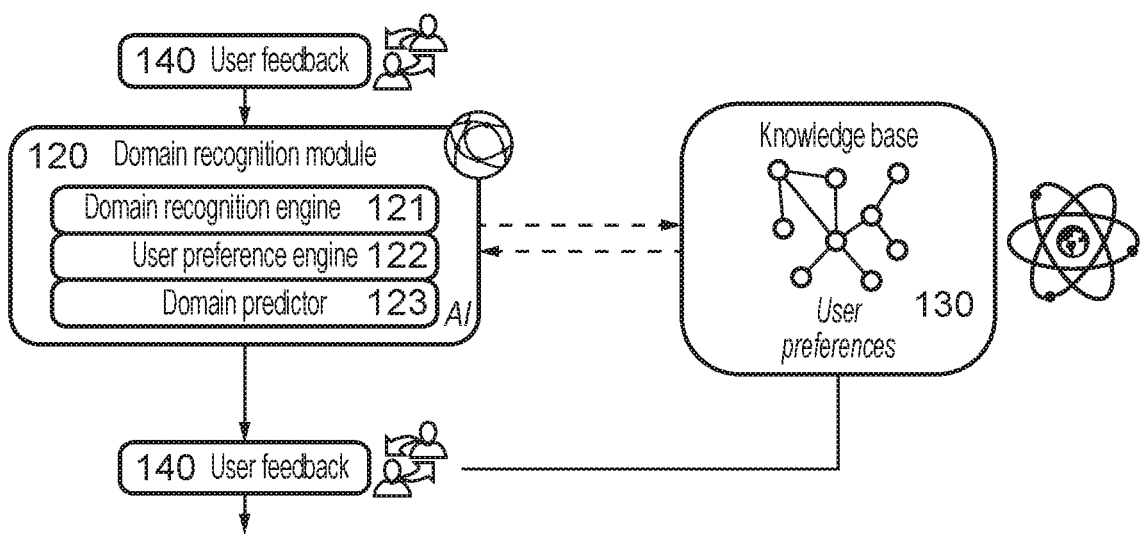
FIG. 6 illustrates a domain recognition module.

The domain recognition module 120 of FIG. 2 and its interaction with the knowledge base 130 and associated components is illustrated in more detail in FIG. 6.

The domain recognition module 120 transforms a characterization of an input dataset as a set of standardized data property labels (label indicating the name or descriptor applied to a column or set of values in the dataset) and a selected entity type assigned to the input dataset, into a domain selection, a domain being a grouping or categorization applied to entity types in the concept hierarchy.

The interaction of the components illustrated in FIG. 6 in transforming the characterization of an input dataset as a set of standardized data property labels, and the selected entity type assigned to the input dataset, into a selection of a domain to which the input dataset is to be assigned in the reconciled data storage, will now be set out.

Figure 7:
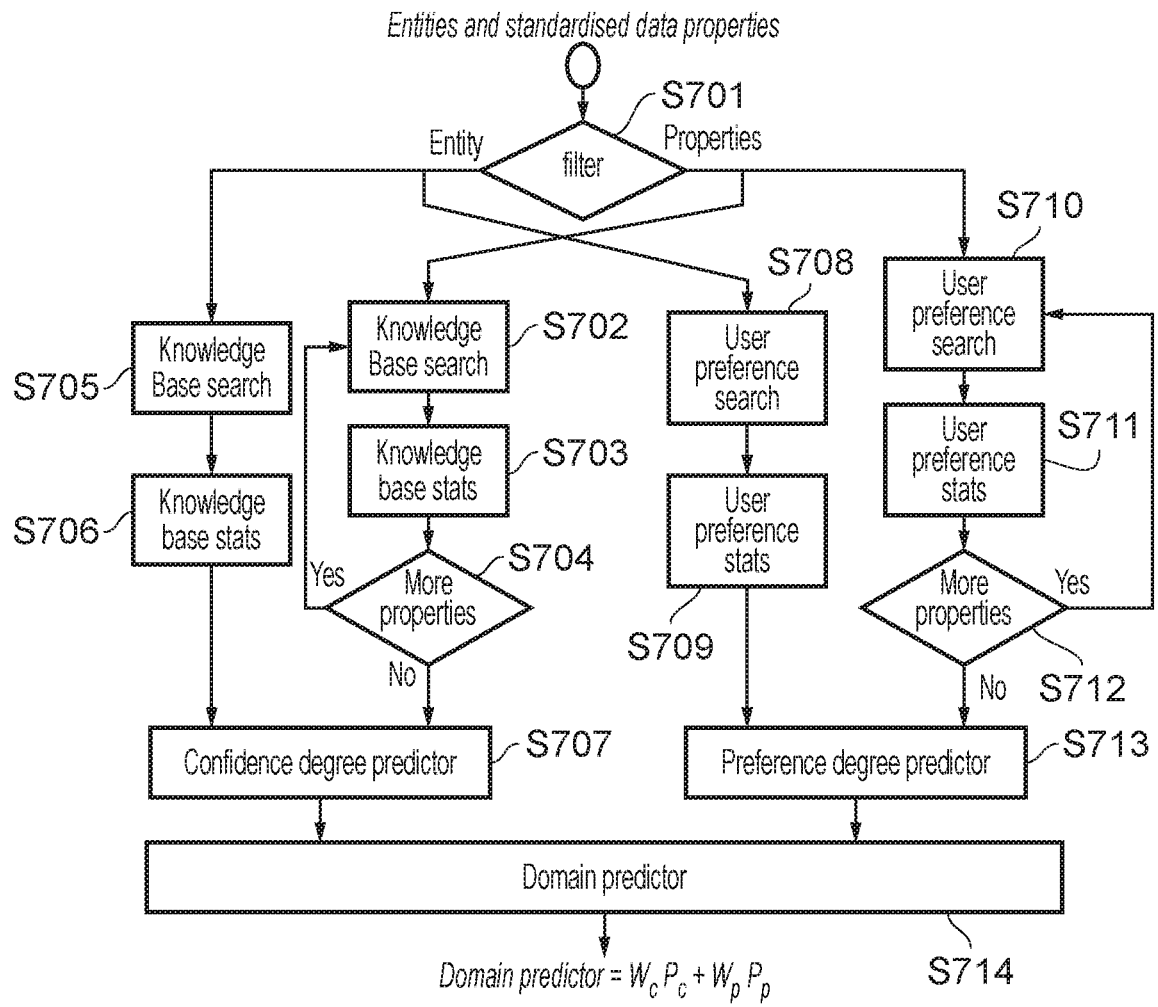
FIG. 7 illustrates a domain recognition process.

FIG. 7 illustrates a flowchart representing the processing steps performed by the domain recognition module 120 into a domain selection.

In this example, a function of the domain recognition module 120 is to provide a scored list of domains, from among those represented in the concept hierarchy by third level nodes, which scores represent accuracy of entities represented in the input dataset into the scored domain, based on the characterization of the input dataset as a set of standardized properties and the selected entity type for the input dataset. The domain recognition module 120 component interacts with the knowledge base to extract insights from the concept hierarchy and historical user input assignments, process the information obtained from the knowledge base interaction to score the domains, and finally, to utilize a user interface to present the highest scoring domains (i.e. the names or labels of those domains as defined in the concept hierarchy) to the user for selection of a domain to assign to the input dataset in the reconciled data storage.

At step S701, the domain recognition module 120 receives a characterization of the input dataset as a set of standardized data properties, that is, an identification of a plurality of labels or titles representing properties for which values are provided in the input dataset, and a selected entity type, that is, a label or title of an entity type. The standardization is an indication that the labels or titles are aligned with (i.e. included among) the property level nodes in the concept hierarchy. The entity type label or title is the label or title of an entity type level (second level) node in the concept hierarchy. The inputs are divided into properties and entity type at S701.

At step S702, the domain recognition engine 121 identifies a second candidate set of domains from the third level nodes representing domains in the concept hierarchy. The identification is based on paths of links (i.e. edges) between the third level nodes and first level nodes representing properties in the set of properties characterizing the input dataset.

The domain recognition engine 121 scores the members of the second candidate set based on the strength of relation in the concept hierarchy between the third level node representing the respective domain and the first level nodes representing the set of standardized properties. An exemplary process for doing so is as follows:

For each standardized property the engine 121 queries the ontology model about all the domains linked by a path of edges to this property in the concept hierarchy, obtaining a list of domains. For example, the process of S702 includes querying the received data properties in the knowledge base and retrieving the results obtained, that is, the paths of edges linking to domains. The results are composed of the standardized data properties searched, the domain linked to the data properties, and the type of relationships stored in the concept hierarchy.

The identified domains within the second candidate set are individually scored based on the retrieved concept hierarchy links to the set of standardized properties characterizing the input dataset. At S703, the results retrieved from the knowledge base for each property are converted into a metric, the third ontology quotient. Each domain related with each property $\text{prop}'_k$ has a probability $P'_i$ and a weight $W'_i$. The probability $P'_i$ is exemplary of the third ontology quotient, and may be calculated as:

$$P'_i = \frac{1}{\sum_{j=1}^{n} r'_j},$$

with $\sum_{j=1}^{n} r'_j$ as the sum of all the relationships between $\text{prop}'_k$ and different domains $d'_j$. For example, a relation is quantified as 1 for each relationship. That means, sum 1 for each relationship (for example, edge in the model ontology) between the property ($\text{prop}'_k$) and a domain ($d'_j$). For instance, if one property has 3 connections, but only 2 are linked to the domain ($d'_j$), then the probability ($P'_i$) between the property ($\text{prop}'_k$) and the domain ($d'_j$) is 0.5 (½), $r'_j$ is 2 instead of 3 because there is only 2 different domains connected.

The weight $W'_i$ is an attribute of the domain-property pair, is exemplary of the third ontology weight, and represents the relevance for each relation established between $\text{prop}'_k$ and the respective domain $d'_j$. $W'_i$ is dynamic and may change based on the acquisition of knowledge by the knowledge base.

At S704 a check is performed to ensure that all received data properties are queried.

For the selected entity type the engine 121 queries the ontology model about all the domains linked by an edge to the domain in the concept hierarchy, obtaining a list of domains. Any domains not already include in the second candidate set are added thereto. For example, the process of S705 includes querying the selected entity type in the knowledge base and retrieving the results obtained, that is, the paths of edges linking to domains. The results are composed of the entity type searched, the domain linked to the data properties, and the type of relationships stored in the concept hierarchy.

At S706, the identified domains from S705 within the second candidate set are individually scored based on the retrieved concept hierarchy links to the selected entity type. The results retrieved from the concept hierarchy are converted into a metric, the second ontology quotient. Each entity type related with a domain has a probability $P_i$ and a weight $W_i$. The probability $P_i$ is exemplary of the second ontology quotient, and may be calculated as:

$$P_i = \frac{1}{\sum_{j=1}^{n} r_j},$$

with $\sum_{j=1}^{n} r_j$ as the sum of all the relationships between ent and different domains $d_j$. For example, a relation is quantified as 1 for each relationship. That means, sum 1 for each relationship (for example, edge in the model ontology) between the entity type (ent) and a domain ($d_j$). For instance, if one entity type has 3 connections, but only 2 are linked to the domain ($d_j$), then the probability ($P_i$) between the entity type (ent) and the domain ($d_j$) is 0.5 (½), $r_j$ is 2 instead of 3 because there is only 2 different domains connected.

The weight $W_i$ is exemplary of the second ontology weight, and may be calculated in the knowledge base 130 and is an attribute of the edges between the entity type level node and the domain level node in the concept hierarchy, for example, based on element relevance, centrality, and other parameters. This weight may be dynamic and modified according to newly acquired knowledge. For each particular pair of nodes, the weight $W_i$ is modified may be modified when new knowledge is acquired. For example, these modifications are done by Artificial Intelligence algorithms which compute the relevance of each node, in this concrete case, the entity type node.

Finally, at S707, the engine 121 provides each member of the candidate set of domains with a degree of confidence, a sum across the set of properties of the second ontology quotients, and the third ontology quotient, or a weighted sum thereof. An exemplary formula for calculating the degree of confidence is set out below.

$$\text{Confidence degree } P_c = W_d \left( \sum_{i=1}^{n} W_i P_i + \sum_{i=1}^{n} W_i' P_i' \right)$$

$W_d$—Weight of the degree of confidence for the domain
$dW_i$—Second ontology weight: Weight of the degree of confidence for the relationship between entity type ent and domain $d_i$.
$P_i$—Second ontology quotient: Prediction of the degree of confidence for the relationship between entity type ent and domain $d_i$.
$W'_i$—Third ontology weight: Weight of the degree of confidence for the relationship between property prop'$_i$ and domain $d_i$.
$P'_i$—Third ontology quotient: Prediction of the degree of confidence for the relationship between property prop'$_i$ and domain $d_i$.

As an example of how $W_d$, $W_i$ and $W'_i$ are calculated, the knowledge base 130 may employ an artificial intelligence algorithm to calibrate the values of $W_d$, $W_i$ and $W'_i$ which configures the weights for each component based on entity type rank for $W_d$, and the relevance of the relationships for $W_i$ and $W'_i$, respectively.

The domain user preference engine 122 scores the members of the second candidate set based on historical user input assignments representing an assignment of a domain to an input dataset characterized by a set of standardized data properties and a selected entity type assigned to entities represented in the input dataset. The engine 122 queries the preferences of the user (i.e. the historical user input assignments of the user) for a given set of properties and respective assigned entity types in the knowledge base 130, providing a set of scored domains based on the historical user input assignments represented in the knowledge base. The engine 122 may generate a score based on the specific user that is controlling a live reconciliation process, based on all users collectively, or based on both the specific user and all users collectively.

As a prerequisite for the functionality of the entity type user preference engine 122, the knowledge base 130 is loaded with data representing historical user input assignments of domains represented by domain (third) level nodes in the concept hierarchy to input datasets. In particular, the knowledge ingestion module 132 captures the historical user input assignments 134 and generates and stores third relation quotients representing an assignment frequency of domain to input dataset based on the standardized data properties characterizing the input dataset, and second relation quotients representing an assignment frequency of a domain to input datasets based on the entity type assigned to entities in the input dataset. In other words, the knowledge base 130 and knowledge ingestion module 132 execute a user input assignment storage process, calculating and storing, for a plurality of node pairs comprising one of the third level nodes and one of the second level nodes, a second relation quotient representing a number of the received third level user input assignments assigning the domain represented by the respective third level node to an entity assigned the entity type represented by the second level node; and calculating and storing, for a plurality of node pairs comprising one of the third level nodes and one of the first level nodes, a third relation quotient representing a number of the received third level user input assignments assigning the domain represented by the respective third level node to an entity represented by a value of the property represented by the first level node.

An exemplary process performed by the domain user preference engine 122 is as follows:

At S708, each domain in the second candidate set linked with the entity type selected for the input dataset is used in a first search to query to the historical user input assignments in the knowledge base 130, with the range of historical user input assignments being those input by the particular user logged into the system and controlling input of the present dataset. The knowledge base records a selection of the domain for an input dataset assigned the entity type, and those records are searched in the query. The record may also be a record of non-selection. A second, equivalent search is performed, as the first search but for all system users collectively, that is, not limited to historical user input assignments of the particular user.

The search results are used to calculate a second user component and a second collective component. The second relation quotient is a sum or a weighted sum of the second user component and the second collective component.

At step S709, each domain related with the entity type ent" has a probability $P''_i$, exemplary of the second user component, and a weight $W''_i$, exemplary of the second user weight, calculated, using the results of the first search. For example, the probability $P''_i$ may be calculated as:

$$P''_i = \frac{1}{\sum_{j=1}^{n} r''_j},$$

with $\sum_{j=1}^{n} r''_j$ as the sum of all the relationships between ent" and different domains $d''_j$ for the pertinent user. For example, a relation is quantified as 1 for each relationship. That means, sum 1 for each relationship (for example, recorded historical user assignment) between the entity type (ent') and a domain ($d''_j$). For instance, if one entity type has 3 connections, but only 2 are linked to the domain ($d''_j$), then the probability ($P''_i$) between the entity type (ent') and the domain ($d''_j$) is 0.5 (½), $r''_j$ is 2 instead of 3 because there is only 2 different domains connected.

Also at S709, In parallel, the engine calculates the probability $P'''_i$, exemplary of the second collective component, and a weight $W'''_i$, exemplary of the second collective weight, for each domain $d'''_j$ and entity type ent''' having into account all the user preferences. For example, $P'''_i$ may be calculated as follows:

$$P'''_i = \frac{1}{\sum_{j=1}^{n} r'''_j},$$

with $\sum_{j=1}^{n} r'''_j$ as the sum of all the relationships between ent" and the different domains $d'''_j$ according to all the users' preferences collectively. For example, a relation is quantified as 1 for each relationship. That means, sum 1 for each relationship (for example, recorded historical user assignment) between the entity type (ent') and a domain ($d'''_j$). For instance, if one entity type has 3 connections, but only 2 are linked to the domain ($d'''_j$), then the probability ($P'''_j$) between the entity type (ent") and the domain ($d'''_j$) is 0.5 (½), $r'''_j$ is 2 instead of 3 because there is only 2 different domains connected.

At S710, for each standardized property prop, for which values are included in the input dataset (i.e. for each property represented by a first level node in the concept hierarchy and included in the set of standardized properties characterizing the input dataset) a first search is performed in which the domain user preference engine 122 queries about all the domains related with the property in the record of historical user input assignments, represented within the knowledge base, of the particular user logged into the system and controlling the input of the dataset. The relation is a record of a selection of the domain for an input dataset including values of the property. The relation may also be a record of non-selection. A second, equivalent search is performed, as the first search but for all system users collectively, that is, not limited to historical user input assignments of the particular user.

At step S711, the first search results are used to generate a third user component and the second search results are used to generate a third collective component. The third relation quotient is a sum or a weighted sum of the third user component and the third collective component.

For each domain related with each property $prop^{iv}_k$ a probability $P^{iv}_i$, exemplary of the third user component, and a weight $W^{iv}_i$, exemplary of the third user weight, are calculated based on the results of the first search. For example, the probability may be calculated as:

$$P^{iv}_i = \frac{1}{\sum_{j=1}^{n} r^{iv}_j},$$

with $\sum_{j=1}^{n} r^{iv}_j$ as the sum of all the relationships between $prop^{iv}_k$ and different domains $d^{iv}_j$ for the pertinent user. For example, a relation is quantified as 1 for each relationship. That means, sum 1 for each relationship (for example, historical user assignment) between the property ($prop^{iv}_k$) and a domain ($d^{iv}_j$). For instance, if one property has 3 historical assignments, but only 2 are linked to the domain ($d^{iv}_j$), then the probability ($P^{iv}_j$) between the property ($prop^{iv}_k$) and the domain ($d^{iv}_j$) is 0.5 (½), $r^{iv}_j$ is 2 instead of 3 because there is only 2 different domains connected.

In parallel, the engine 121 calculates probability $P^v_i$ exemplary of the third collective component, and a weight $W^v_i$, exemplary of the third collective weight, for each domain $d^v_j$ related with the properties $prop^v_k$ taking into account the user preferences of all users collectively. For example, $P^v_i$ may be calculated as follows:

$$P^v_i = \frac{1}{\sum_{j=1}^{n} r^v_j},$$

with $\sum_{j=1}^{n} r^v_j$ as the sum of all the relationships between $prop^v_k$ and the different domains $d^v_j$ according to the user preferences of all users collectively.

For example, a relation is quantified as 1 for each relationship. That means, sum 1 for each relationship between the property ($prop^v_k$) and a domain ($d^v_j$). For instance, if one property has 3 historical assignments, but only 2 are linked to the domain ($d^v_j$), then the probability ($P^v_j$) between the property ($prop^v_k$) and the domain ($d^v_j$) is 0.5 (½), $r^v_j$ is 2 instead of 3 because there is only 2 different domains connected.

At S712 a check is performed to ensure that all received data properties are queried.

At S713 the domain predictor 123 combines the scores for each domain in the second candidate set calculated at steps S709 and S711, in order to generate a preference degree representing a strength of relation of each domain to the set of properties characterizing the input dataset and to the entity type selected for the input dataset based on historical user input assignments. An exemplary formula for the combination is set out below:

$$\text{Preference degree } P_p = W'_d \left( \sum_{i=1}^{n} W''_i P''_i i_i + \sum_{i=1}^{n} W'''_i P'''_i + \sum_{i=1}^{n} W^{iv}_i P^{iv}_i + \sum_{i=1}^{n} W^{v}_i P^{v}_i \right)$$

$W'_d$—Weight of the degree of preference for the domain d.

$W''$—second user weight: Weight of preference for the relationship between entity ent and domain d for a specific user.

$P''_i$—second user component: Prediction of the degree of preference for the relationship between entity type ent and domain d for a specific user. $W''''_i$—second collective weight: Weight of the degree of preference for the relationship between entity type ent and domain d for all the users.

$P'''_i$—second collective component: Prediction of the degree of preference for the relationship between entity type ent and domain d for all the users.

$W^{iv}_i$—third user weight: Weight of the degree of preference for the relationship between property $prop_k$ and domain d for a specific user.

$P^{iv}_i$—third user component: Prediction of preference for the relationship between property $prop_i$, and domain d for a specific user.

$W^{v}_i$—third collective weight: Weight of the degree of preference for the relationship between property $prop_k$ and domain d for all the users.

$P^{v}_i$—third collective component: Prediction of preference for the relationship property $prop_k$ and domain d for all the users.

As an example of how $W'_d$, $W''_i$, $W''''_i$, and $W^{v}_i$ are calculated, the weights may be fitted with an artificial intelligence algorithm which configures the weights for each component based on domain rank for $W'_d$ and the relevance of the relationships for $W''_i$, $W''''_i$, $W^{iv}_i$ and $W^{v}_i$.

At S714, the domain predictor 123 combines the score for each domain calculated at steps S707 and S713 to generate a second candidate score for each domain in the second candidate set. An exemplary formula used by the domain predictor 123 in calculating the second candidate score for each domain is set out below:

$$\text{Domain predictor} = W_e P_e + W_p P_p$$

$W_e$—Weight of the degree of confidence component in domain discovery engine.

$P_e$—Prediction of the degree of confidence in domain discovery engine.

$W_p$—Weight of the degree of preference of the user component in domain discovery engine.

$P_p$—Prediction of the degree of preference of the user in domain discovery engine.

As an example of how $W_e$ and $W_p$ are calculated, the knowledge base 130 may employ an artificial intelligence algorithm to calculate the weights, based on the degree of centricity for each element in the knowledge base and other parameters, obtaining a customized response for each user. In the domain predictor equation, the weights $W_e$ and $W_p$ are not the domain-specific weights, but are general weightings applied to confidence degree (i.e. ontology quotient based on ontology structure/properties/information) and preference degree (i.e. relation quotient based on user input assignments).

Either: the highest scoring domain is selected by the system and assigned to the input dataset, or, the n highest scoring domains (wherein n is a positive integer greater than 1) are presented to the user via the user interface and an user input assignment selecting one domain from among those presented is received (also via the user interface).

Figure 8:
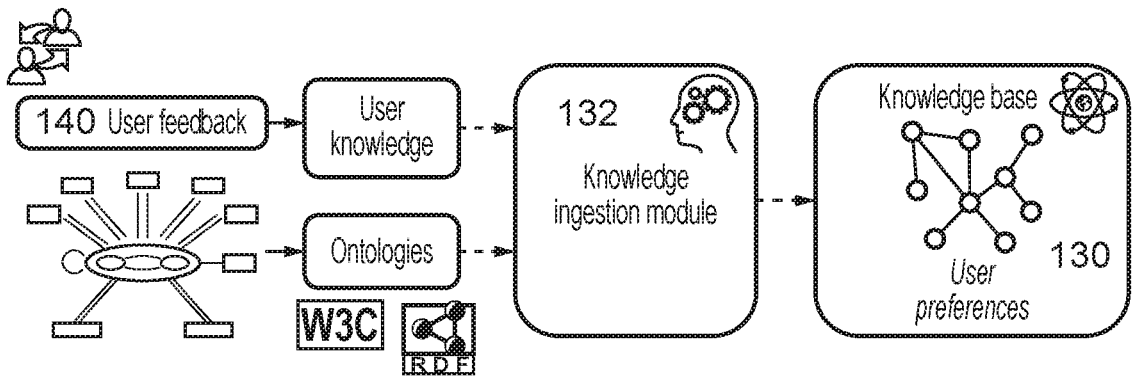
FIG. 8 illustrates a knowledge ingestion module.

The knowledge ingestion module 132 of FIG. 2 and its interaction with the knowledge base 130 and input data is illustrated in more detail in FIG. 8. The knowledge ingestion module 132 and knowledge base 130 cooperate to perform a user input assignment storage process, which may include calculating and storing, for a plurality of node pairs comprising one of the second level nodes and one of the first level nodes, a first relation quotient representing a number of the received user input assignments assigning the entity type represented by the second level node to an entity (or dataset of entities) represented by a value of the property represented by the first level node. The user input assignment storage process may also include for a plurality of node pairs comprising one of the third level nodes and one of the first level nodes, a third relation quotient representing a number of the received user input assignments assigning the domain represented by the third level node to an entity (or dataset of entities) represented by a value of the property represented by the first level node. The user input assignment storage process may also include for a plurality of node pairs comprising one of the third level nodes and one of the second level nodes, a second relation quotient representing a number of the received user input assignments assigning the domain represented by the third level node to an entity (or dataset of entities) assigned the entity type represented by the second level node.

In the particular example of FIG. 8, the knowledge ingestion module 132 is responsible for ingesting knowledge from the user, as user knowledge, and from external data sources, as ontologies, into the knowledge base 130. This knowledge can be provided through ontologies or through the expertise of users. For both cases, the knowledge ingestion module 132 provides a mechanism able to parse and load the information provided by ontologies like OWL or users input assignments selecting entity type or domain for input datasets.

Figure 9:
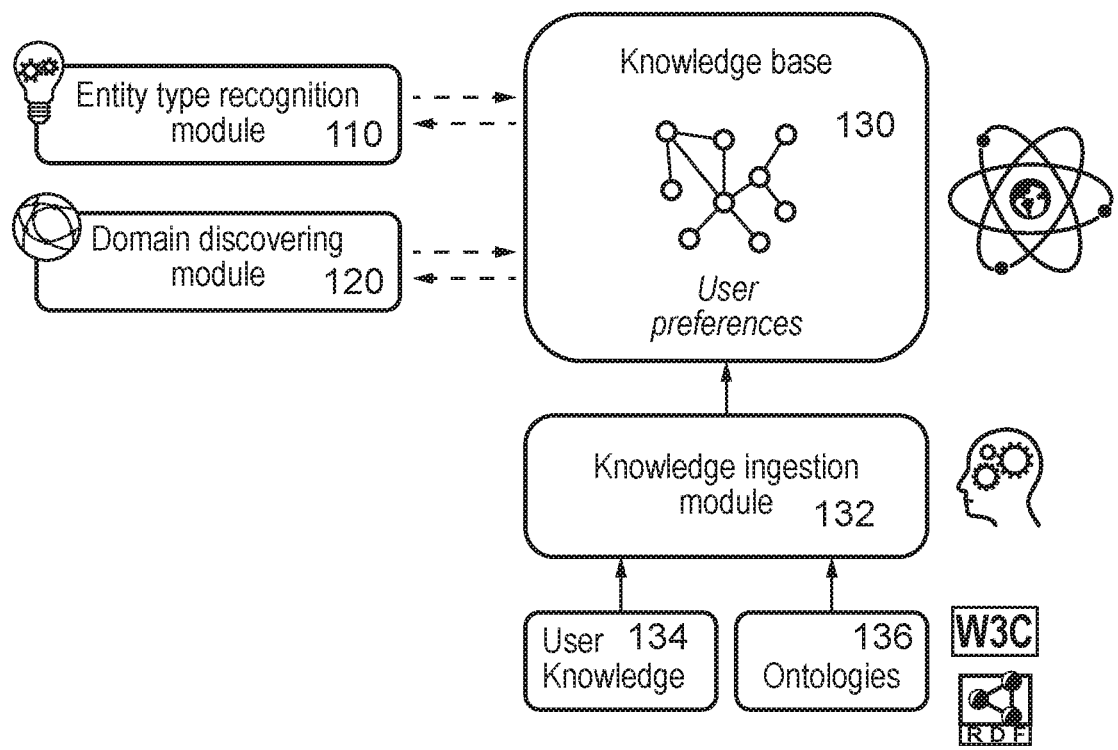
FIG. 9 illustrates a knowledge base.

The knowledge base 130 of FIG. 2 and its interaction with other components is illustrated in more detail in FIG. 9. The knowledge base 130 is a storage device or plurality of interconnected storage devices and an associated management device including a processor. The knowledge base 130 is accessible to the entity type recognition module 110 and the domain discovering module 120.

The exemplary knowledge base 130 of FIG. 9 is responsible for storing and supplying the knowledge needed by the system. The data, and the knowledge represented by said data, stored in the knowledge base module 130 is required for the scoring and selection of candidates by the entity type recognition module 110 and the domain recognition module 120. The knowledge base module 130 has a knowledge base repository, and in addition, the knowledge base module 130 may also store AI-based models to calculate the scoring of the weights for scoring candidates, including the first, second, and third user weights, and the first, second, and third component weights.

Figure 10:
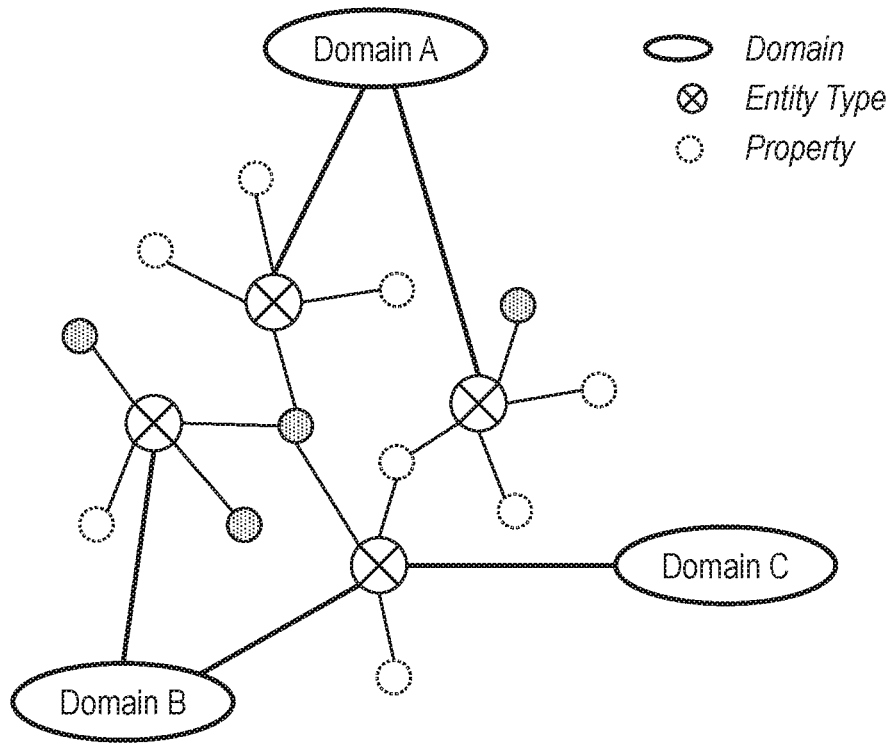
FIG. 10 illustrates a concept hierarchy.

The knowledge base 130 stores the concept hierarchy including a node with a title, label, or descriptor for each of the standardized data properties, the entity types and the domains. The concept hierarchy also stores the relation between nodes (parent, neighborhood, related, etc.), as is depicted in FIG. 10. Moreover, the knowledge base 130 may add annotations to the concept hierarchy representing the relevance and user input assignment frequency statistics of each element and the relations, providing statistics components which support the AI based models to calculate the scorings and rankings.

The preferences of specific system users and system users collectively are stored in the knowledge base 130. As a particular storage mode, the concept hierarchy may be stored with relations representing historical user input assignments of entity types and domains to input datasets having values of particular properties, the relations being between entity type level nodes (second level nodes) representing the respective entity type, domain level nodes (third level nodes) representing the respective domain, and property level nodes (first level nodes) representing the respective properties.

Figure 11:
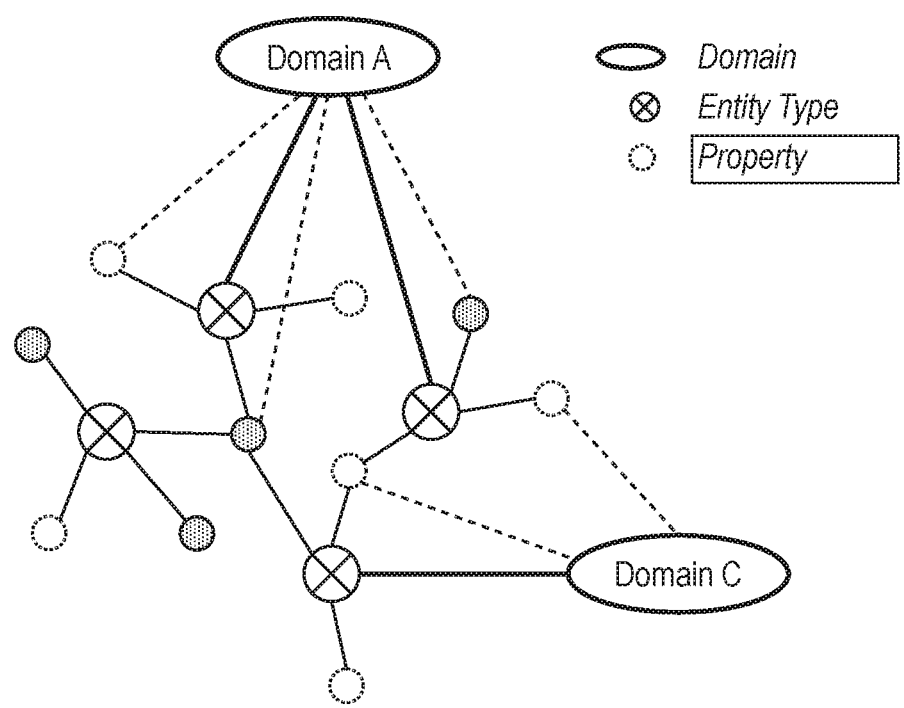
FIG. 11 illustrates graph data storing knowledge acquired through ontologies and from users collectively.

For example, FIG. 11 illustrates a representation of graph data storing the knowledge acquired through ontologies and the knowledge introduced by the users as a collective, as well as, the preferences of the users which stores the preferences of the collective users with the statistical metrics, such as, scorings and weights. Relations in the graph data between domain level nodes and property level nodes represent historical assignment by all system users of the domain represented by the domain level node to input datasets having values of properties represented by the property level nodes. Relations in the graph data between entity type level nodes and property level nodes represent historical assignment by all system users of the entity type represented by the entity type level node to input datasets having values of properties represented by the property level nodes.

Figure 12:
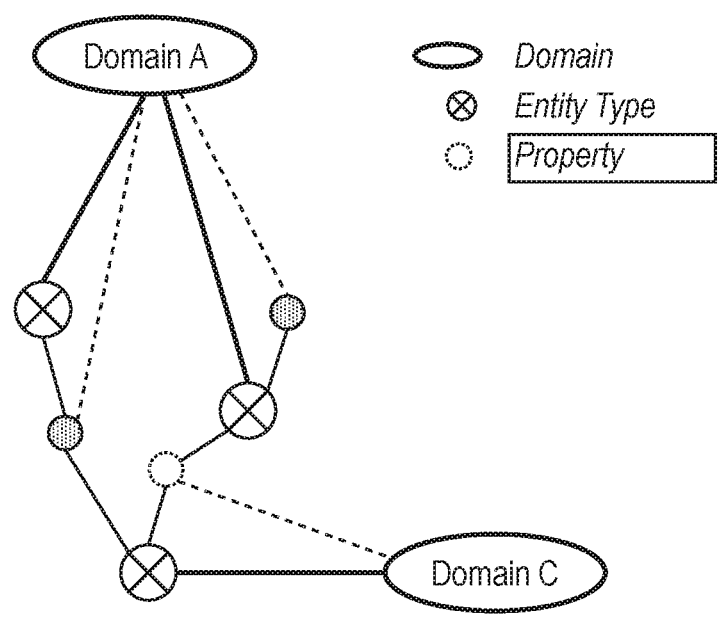
FIG. 12 illustrates graph data storing knowledge acquired through ontologies and from an individual user.

FIG. 12 illustrates a representing of graph data storing the knowledge acquired through ontologies and the preferences (i.e. the historical user input assignments) of a particular system user. Relations in the graph data between domain level nodes and property level nodes represent historical assignment by the particular user of the domain represented by the domain level node to input datasets having values of properties represented by the property level nodes. Relations in the graph data between entity type level nodes and property level nodes represent historical assignment by the particular system user of the entity type represented by the entity type level node to input datasets having values of properties represented by the property level nodes.

The historical user input assignments may be stored in tabular form or may be represented by scores and metrics attributed to edges between nodes in graph data in the concept hierarchy, or in the graph data representing user preferences. Scores and metrics may also be attributed to nodes, for instance to calculate $W_d$ or $W'_d$ or $W_e$. The knowledge base module 130 may include a processor for calculating statistical metrics which compute specific scorings for edges linking pairs of nodes in the graph data and in the concept hierarchy. The metrics may be determined based on AI models which obtain the specific weights that change dynamically with the acquisition of new knowledge or the store of user preferences.

In addition to the components illustrated in FIG. 2, embodiments may include a reconciled dataset storage apparatus comprising a plurality of physical storage devices for storing input datasets; and a reconciled dataset storage controller configured to execute a process including: for each of a plurality of input datasets, using the selected second level node as an index or key with which to allocate the input dataset to a physical storage device among the plurality of physical storage devices.

In a particular example, each third level node corresponds to a distinct physical storage area among the plurality of physical storage devices of the reconciled dataset storage apparatus, and each of the input datasets is assigned to the distinct physical storage area corresponding to the third level node selected for the respective input dataset, wherein each distinct physical storage area comprises one or more physical storage devices within which the second level node selected for the respective input dataset is used as an index or key with which to allocate the input dataset to a physical storage device.

Figure 13:
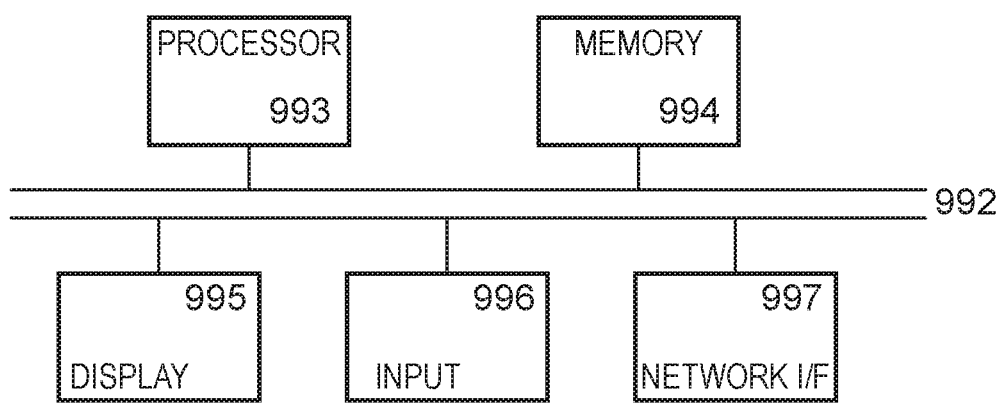
FIG. 13 illustrates a hardware architecture of an embodiment.

FIG. 13 is a block diagram of a computing device, such as a server, for example a data storage server which may be used to implement a method of an embodiment of FIGS. 5 and 7. The computing device comprises a processor 993, and memory, 994. Optionally, the computing device also includes a network interface 997 for communication with other computing devices, for example with other computing devices of the embodiments.

For example, an embodiment may be composed of a network of such computing devices. Optionally, the computing device also includes one or more input mechanisms such as keyboard and mouse 996, and a display unit such as one or more monitors 995. The components are connectable to one another via a bus 992.

The memory 994 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations. Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The processor 993 is configured to control the computing device and execute processing operations, for example executing code stored in the memory to implement the various different functions of modules, components, and processes described here and in the claims. The memory 994 stores data being read and written by the processor 993. As referred to herein, a processor may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The display unit 997 may display a representation of data stored by the computing device and may also display a cursor and dialog boxes and screens enabling interaction between a user and the programs and data stored on the computing device. The input mechanisms 996 may enable a user to input data and instructions to the computing device.

The network interface (network I/F) 997 may be connected to a network, such as the Internet, and is connectable to other such computing devices via the network. The network I/F 997 may control data input/output from/to other apparatus via the network. Other peripheral devices such as microphone, speakers, printer, power supply unit, fan, case, scanner, trackerball etc may be included in the computing device.

The entity type recognition module 110 of FIGS. 1, 2, 4, and 9, may be a processor 993 (or plurality thereof) executing processing instructions (a program) stored on a memory 994 and exchanging data via a network I/F 997. In particular, the processor 993 executes processing instructions to receive a set of data properties characterizing an input dataset from either a data property recognition module or some other input mechanism, and process the set of data properties based on the concept hierarchy and stored historical user input assignments, as in step S501 to S511, to generate a selection of an entity type for the input dataset, or a plurality thereof for presentation to the user via the user interface 140. Furthermore, the processor 993 may execute processing instructions to store the selected entity type with the input dataset on a connected storage unit and/or to transmit, via the network I/F 997, the entity type selection to the domain recognition module 120 for use in selecting a domain for the input dataset.

The domain recognition module 120 of FIGS. 1, 2, 6, and 9, may be a processor 993 (or plurality thereof) executing processing instructions (a program) stored on a memory 994 and exchanging data via a network I/F 997. In particular, the processor 993 executes processing instructions to receive a set of data properties characterizing an input dataset from either a data property recognition module or the entity type recognition module 110 or some other input mechanism, and a selection of entity type for the input dataset from the entity type recognition module 110 and process the set of data properties and the selection of entity type based on the concept hierarchy and stored historical user input assignments, as in step S701 to S714, to generate a selection of a domain for the input dataset, or a plurality thereof for presentation to the user via the user interface 140. Furthermore, the processor 993 may execute processing instructions to store the selected domain with the input dataset on a connected storage unit and/or to transmit, via the network I/F 997, the entity type selection, the domain selection, and the set of data properties to the knowledge base module 130 via the knowledge base ingestion module 132 for storage as an historical user input assignment.

The user interface 140 of FIGS. 1, 2, 4, 6, & 8 may be a processor 993 (or plurality thereof) executing processing instructions (a program) stored on a memory 994 and exchanging data with a system user via a network I/F 997 and input mechanism. In particular, the processor 993 executes processing instructions to receive a plurality of either entity type selections or domain selections from the respective recognition module, present the selections to the user, and receive a user input assignment specifying one entity type or ne domain to assign to the input dataset. Furthermore, the processor 993 may execute processing instructions to store the user input assignment on the knowledge base 130 and/or to transmit, via the network I/F 997, a user input assignment of an entity type to the domain recognition module 120 for further processing.

The knowledge base 130 and knowledge base ingestion module 132 of FIGS. 1, 2, 4, 6, 8, and 9 may be a processor 993 (or plurality thereof) executing processing instructions (a program) stored on a memory 994. In particular, the processor 993 executes processing instructions to receive, via the network I/F, user input assignments from the user interface 140 and store the user input assignments, along with the model ontology representing ontological information from plural external data sources for access by the entity type recognition module 110 and domain recognition module 120 as in steps S503, S507, S702, S705, S708, & S710. Furthermore, the processor 993 may execute processing instructions to store a record of the historical user input assignments and the model ontology on the knowledge base module 130.

Methods of the embodiments may be carried out on a computing device such as that illustrated in FIG. 13. Such a computing device need not have every component illustrated in FIG. 13, and may be composed of a subset of those components. A method of the embodiments may be carried out by a single computing device in communication with one or more data storage servers via a network. The computing device may be a data storage itself storing the reconciled input datasets.

A method of the embodiments may be carried out by a plurality of computing devices operating in cooperation with one another. One or more of the plurality of computing devices may be a data storage server storing at least a portion of the reconciled input datasets.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A system for reconciling input datasets with a model ontology, the system comprising a processor coupled to a memory, the memory storing instructions which when executed by the processor cause the processor to perform:
   a model ontology storage process, storing a model ontology graph defining a concept hierarchy, the concept hierarchy comprising:
   second level nodes at a second level of the concept hierarchy, each second level node representing a respective entity type; and
   first level nodes at a first level of the concept hierarchy, each first level node representing a respective property, and being linked in the graph to one or more second level nodes;
   the processor to further execute:
   a user interface process, receiving, via a user interface, for each of a plurality of input datasets each having values of one or more properties represented by first level nodes of the concept hierarchy, a second level user input assignment, assigning an entity type represented by a second level node to an entity represented by said values in the dataset;
   a user input assignment storage process, calculating and storing, for each of a plurality of node pairs comprising one of the second level nodes and one of the first level nodes, a first relation quotient representing a number of received user input assignments assigning the entity type represented by the second level node to the entity represented by a value of the property represented by the first level node;

an input dataset reconciliation process:
receiving an input dataset having values of a plurality of properties represented by first level nodes of the concept hierarchy;
selecting a second level node from the concept hierarchy based on:
links in the concept hierarchy between the second level node and first level nodes representing properties in the received input dataset; and the stored first relation quotient for each of the node pairs comprising the second level node and one of the first level nodes representing properties in the received input dataset; and
storing the input dataset in a reconciled dataset storage as graph data with the values of the plurality of properties linked to respective first level nodes and the first level nodes linked to the selected second level node.

2. The system according to claim 1, wherein the system is accessible by a plurality of users, each user being identifiable to the system with a respective user ID;
the user interface to receive the user input assignments for each of the plurality of datasets from one or more of the plurality of users, in association with the respective user ID;
the user input assignment storage process including calculating and storing a first relation quotient for each of the plurality of node pairs for individual user IDs from the plurality of users based on user input assignments associated with the respective user ID; and
the input dataset reconciliation process being performed according to instruction from a user among the plurality of users, and including selecting the second level node based on the first relation quotients stored for the respective user ID.

3. The system according to claim 2, wherein
the user input assignment storage process further includes calculating and storing each of the first relation quotients based on received user input assignments from the plurality of users collectively;
the input dataset reconciliation process including selecting the second level node based on both the first relation quotients stored for the plurality of users collectively and the first relation quotients stored for the respective user ID.

4. The system according to claim 3, wherein
the input dataset reconciliation process comprises selecting the second level node by:
for each of the first level nodes representing properties of which values are included in the input dataset, adding to a first candidate set or each second level node linked to the respective first level node in the model ontology;
for each second level node in the first candidate set, calculating, for each first level node linked to the second level node in the model ontology:
a first ontology quotient, quantifying a relation between the first level node and the second level node based on information stored in the model ontology graph;
the first relation quotient, the first relation quotient comprising:
a first user component quantifying a number of the received user input assignments assigning the entity type represented by the second level node to an entity represented by a value of the property represented by the first level node, from the user input assignments stored in association with the user ID of the user instructing the input dataset reconciliation process; and
a first collective component quantifying a number of the received user input assignments assigning the entity type represented by the second level node to an entity represented by a value of the property represented by the first level node, from the user input assignments stored in association with the plurality of user IDs collectively; and
a first candidate score for the second level node, the first candidate score being each first ontology quotient multiplied by a respective first ontology weight, plus each first user component multiplied by a respective first user weight, plus each first collective component multiplied by a respective first collective weight; and
the selected second level node being either the second level node from the first candidate set having a greatest first candidate score, or the second level node assigned via the user interface from a presentation on the user interface of top n second level nodes from the first candidate set when ranked by first candidate score.

5. The system according to claim 1, wherein
a first level node is linked in the model ontology graph to a second level node when there is an edge or monodirectional continuous path of edges in the concept hierarchy from the first level node to the second level node.

6. The system according to claim 1, wherein the concept hierarchy further comprises:
third level nodes at a third level of the concept hierarchy, each third level node representing a respective domain and being linked in the graph to one or more second level nodes and to one or more third level nodes;
the user interface process including receiving a third level user input assignment, via the user interface, for each of a plurality of input datasets each having:
values of one or more properties represented by first level nodes of the concept hierarchy; and
an entity type represented by a second level node of the concept hierarchy assigned to an entity represented by said values in the dataset; and
the third level user input assignment assigning a domain represented by a third level node to the entity represented by said values in the dataset;
the user input assignment storage process further comprising:
calculating and storing, for a plurality of node pairs comprising one of the third level nodes and one of the second level nodes, a second relation quotient representing a number of the received third level user input assignments assigning the domain represented by the respective third level node to an entity assigned the entity type represented by the second level node; and
calculating and storing, for each of a plurality of node pairs comprising one of the third level nodes and one of the first level nodes, a third relation quotient representing a number of the received third level user input assignments assigning the domain represented by the respective third level node to an entity represented by a value of the property represented by the first level node;
the input dataset reconciliation process further comprising:
  selecting a third level node from the concept hierarchy based on:
    links in the concept hierarchy between the third level node and the selected second level node;
    the second relation quotient between the third level node and the selected second level node;
    links in the concept hierarchy between the third level node and first level nodes representing properties in the received input dataset; and
    the third relation quotients between the third level node and one of the first level nodes representing properties in the received input dataset; and
  storing the input dataset in a reconciled dataset storage as graph data with the values of the plurality of properties linked to respective first level nodes and the first level nodes linked to both the selected second level node and the selected third level node, and with the selected second level node linked to the selected third level node.

7. The system according to claim 6, wherein the system is accessible by a plurality of users, each user being identifiable to the system with a respective user ID;
the user interface to receive the user input assignments for each of the plurality of datasets from one or more of the plurality of users, in association with the respective user ID;
the user input assignment storage process including calculating and storing each of the second and third relation quotients for the plurality of node pairs for individual user IDs from the plurality of users based on user input assignments associated with the respective user ID; and
the input dataset reconciliation process being performed according to instruction from a user among the plurality of users, and including selecting the third level node based on the second and third relation quotients stored for the respective user ID.

8. The system according to claim 7, wherein
the user input assignment storage process further includes calculating and storing each of the first relation quotients based on received user input assignments from the plurality of users collectively; and
the input dataset reconciliation process including selecting the third level node based on the second relation quotients stored for both the plurality of users collectively and the respective user ID, and based on the third relation quotients stored for both the plurality of users collectively and the respective user ID.

9. The system according to claim 8, wherein
the input dataset reconciliation process comprises selecting the third level node by:
  for each of the first level nodes representing properties of which values are included in the input dataset, adding to a second candidate set the or each third level node linked to the respective first level node in the model ontology;
  adding to the second candidate set the, or each, third level node linked to the selected second level node in the model ontology;
  for each third level node in the candidate set, calculating, for each first level node linked to the third level node in the model ontology:
    a third ontology quotient, quantifying a relation between the first level node and the third level node based on information stored in the model ontology graph;
    a second ontology quotient, quantifying a relation between the selected second level node and the third level node based on information stored in the model ontology graph;
  the third relation quotient, the third relation quotient comprising: a third user component quantifying a number of the received user input assignments assigning the domain represented by the third level node to an entity represented by a value of the property represented by the first level node, from the user input assignments stored in association with the user ID of the user instructing the input dataset reconciliation process; and a third collective component quantifying a number of the received user input assignments assigning the domain represented by the third level node to an entity represented by a value of the property represented by the first level node, from the user input assignments stored in association with the plurality of user IDs collectively;
  the second relation quotient, the second relation quotient comprising: a second user component quantifying a number of the received user input assignments assigning the domain represented by the third level node to an entity of the entity type represented by the selected second level node, from the user input assignments stored in association with the user ID of the user instructing the input dataset reconciliation process; and a second collective component quantifying a number of the received user input assignments assigning the domain represented by the third level node to an entity of the entity type represented by the selected second level node, from the user input assignments stored in association with the plurality of user IDs collectively; and
  a second candidate score for the third level node, the second candidate score being the second ontology quotient multiplied by a second ontology weighting, plus the second ontology quotient multiplied by a second ontology weighting, plus the third ontology quotient multiplied by a third ontology weighting, plus the third user component multiplied by a third user weighting;
the selected third level node being the member of the second candidate set having the greatest second candidate score.

10. The system according to claim 1, wherein
a first level node is linked in the model ontology graph to a third level node when there is an edge or monodirectional continuous path of edges in the concept hierarchy from the first level node to the third level node; and
a second level node is linked in the model ontology graph to a third level node when there is an edge or monodirectional continuous path of edges in the concept hierarchy from the second level node to the third level node.

11. The system according to claim 1, further comprising:
a reconciled dataset storage apparatus comprising a plurality of physical storage devices for storing input datasets; and
a reconciled dataset storage controller to execute a process including:

for each of a plurality of input datasets, using the selected second level node as one off an index and a key with which to allocate the input dataset to a physical storage device among the plurality of physical storage devices.

12. The system according to claim 6, wherein each third level node corresponds to a distinct physical storage area among the plurality of physical storage devices of the reconciled dataset storage apparatus, and each of the input datasets is assigned to the distinct physical storage area corresponding to the third level node selected for the respective input dataset, wherein each distinct physical storage area comprises one or more physical storage devices within which the second level node selected for the respective input dataset is used as an index or key with which to allocate the input dataset to a physical storage device.

13. A computer-implemented method for reconciling input datasets with a model ontology, the computer-implemented method comprising:
   a model ontology storage process, storing a model ontology graph defining a concept hierarchy, the concept hierarchy comprising:
      second level nodes at a second level of the concept hierarchy, each second level node representing a respective entity type; and
      first level nodes at a first level of the concept hierarchy, each first level node representing a respective property, and being linked in the graph to one or more second level nodes;
   the computer-implemented method further comprising:
      a user interface process, receiving, via a user interface, for each of a plurality of input datasets each having values of one or more properties represented by first level nodes of the concept hierarchy, a second level user input assignment, assigning an entity type represented by a second level node to an entity represented by said values in the dataset; and
      a user input assignment storage process, calculating and storing, for each of a plurality of node pairs comprising one of the second level nodes and one of the first level nodes, a first relation quotient representing a number of the received user input assignments assigning the entity type represented by the second level node to an entity represented by a value of the property represented by the first level node;
      an input dataset reconciliation process:
         receiving an input dataset having values of a plurality of properties represented by first level nodes of the concept hierarchy;
         selecting a second level node from the concept hierarchy based on: links in the concept hierarchy between the second level node and first level nodes representing properties in the received input dataset; and the stored first relation quotient for each of the node pairs comprising the second level node and one of the first level nodes representing properties in the received input dataset; and
         storing the input dataset in a reconciled dataset storage as graph data with the values of the plurality of properties linked to respective first level nodes and the first level nodes linked to the selected second level node.

14. A non-transitory computer readable storage medium storing a computer program which, when executed by a computing apparatus, causes the computing apparatus to perform a computer-implemented method for reconciling input datasets with a model ontology, the computer-implemented method comprising:
   a model ontology storage process, storing a model ontology graph defining a concept hierarchy, the concept hierarchy comprising:
      second level nodes at a second level of the concept hierarchy, each second level node representing a respective entity type; and
      first level nodes at a first level of the concept hierarchy, each first level node representing a respective property, and being linked in the graph to one or more second level nodes;
   the computer-implemented method further comprising:
      a user interface process, receiving, via a user interface, for each of a plurality of input datasets each having values of one or more properties represented by first level nodes of the concept hierarchy, a second level user input assignment, assigning an entity type represented by a second level node to an entity represented by said values in the dataset; and
      a user input assignment storage process, calculating and storing, for each of a plurality of node pairs comprising one of the second level nodes and one of the first level nodes, a first relation quotient representing a number of the received user input assignments assigning the entity type represented by the second level node to an entity represented by a value of the property represented by the first level node; and
   an input dataset reconciliation process:
      receiving an input dataset having values of a plurality of properties represented by first level nodes of the concept hierarchy;
      selecting a second level node from the concept hierarchy based on: links in the concept hierarchy between the second level node and first level nodes representing properties in the received input dataset; and the stored first relation quotient for each of the node pairs comprising the second level node and one of the first level nodes representing properties in the received input dataset; and
      storing the input dataset in a reconciled dataset storage as graph data with the values of the plurality of properties linked to respective first level nodes and the first level nodes linked to the selected second level node.

* * * * *